United States Patent
Lientz et al.

(10) Patent No.: US 8,934,374 B2
(45) Date of Patent: *Jan. 13, 2015

(54) REQUEST MODIFICATION FOR TRANSPARENT CAPACITY MANAGEMENT IN A CARRIER NETWORK

(71) Applicant: Edgecast Networks, Inc., Santa Monica, CA (US)

(72) Inventors: Andrew Lientz, Bellevue, WA (US); Jayson G. Sakata, Encino, CA (US); Alexander A. Kazerani, Santa Monica, CA (US)

(73) Assignee: Edgecast Networks, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/895,090

(22) Filed: May 15, 2013

(65) Prior Publication Data
US 2013/0265873 A1    Oct. 10, 2013

Related U.S. Application Data

(63) Continuation of application No. 12/947,753, filed on Nov. 16, 2010, now Pat. No. 8,457,010.

(51) Int. Cl.
*H04J 1/16* (2006.01)
*H04J 3/16* (2006.01)

(52) U.S. Cl.
USPC ............................ 370/252; 370/352; 370/465

(58) Field of Classification Search
USPC .................................. 370/252, 352, 392.465
See application file for complete search history.

(56) References Cited

U.S. PATENT DOCUMENTS

| | | | |
|---|---|---|---|
| 5,732,219 | A | 3/1998 | Blumer et al. |
| 5,991,735 | A | 11/1999 | Gerace |
| 6,108,703 | A | 8/2000 | Leighton et al. |
| 6,415,368 | B1 | 7/2002 | Glance et al. |
| 6,553,413 | B1 | 4/2003 | Leighton et al. |
| 7,103,645 | B2 | 9/2006 | Leighton et al. |
| 7,693,959 | B2 | 4/2010 | Leighton et al. |
| 2002/0071419 | A1 | 6/2002 | Paranchych et al. |
| 2003/0005084 | A1 | 1/2003 | Humphrey |
| 2003/0115421 | A1 | 6/2003 | McHenry et al. |
| 2003/0130862 | A1 | 7/2003 | Stern et al. |
| 2007/0195700 | A1 | 8/2007 | Katoh et al. |
| 2008/0254827 | A1 | 10/2008 | Hunter |
| 2009/0024736 | A1 | 1/2009 | Langille et al. |
| 2009/0150768 | A1 | 6/2009 | Bae et al. |
| 2009/0313318 | A1 | 12/2009 | Dye et al. |
| 2010/0020685 | A1 | 1/2010 | Short et al. |

(Continued)

*Primary Examiner* — Andrew Lee

(57) ABSTRACT

Some embodiments provide a capacity management agent that modifies content requests to adjust bandwidth consumption when streaming requested content from a content provider to a requesting user. The modifications include modifying a URL or header information of the request. The agent performs a process that receives a request for content of a content provider. The process identifies a parameter of the carrier network and modifies the request when the parameter satisfies a threshold. The process passes the request to the content provider and the content provider provides content that consumes a first set of resources in response to an unmodified request and a second set of resources in response to a modified request. When the parameter identifies congestion, the first set of resources is greater than the second set of resources. When the condition parameter identifies underutilization, the first set of resources is less than the second set of resources.

22 Claims, 15 Drawing Sheets

(56) References Cited

U.S. PATENT DOCUMENTS

| | | |
|---|---|---|
| 2010/0034089 A1 | 2/2010 | Kovvali et al. |
| 2010/0085606 A1 | 4/2010 | Daos |
| 2010/0157887 A1 | 6/2010 | Kopplin |
| 2011/0153656 A1 | 6/2011 | Sundstrom et al. |
| 2011/0167170 A1 | 7/2011 | Kovvali et al. |
| 2011/0213888 A1 | 9/2011 | Goldman et al. |
| 2011/0239078 A1 | 9/2011 | Luby et al. |
| 2012/0110111 A1 | 5/2012 | Luna et al. |
| 2012/0315890 A1 | 12/2012 | Suzuki et al. |
| 2012/0324091 A9 | 12/2012 | Raleigh et al. |
| 2013/0006780 A1 | 1/2013 | Raleigh et al. |

REQUEST MODIFICATION FOR TRANSPARENT CAPACITY MANAGEMENT IN A CARRIER NETWORK

CLAIM OF BENEFIT TO RELATED APPLICATIONS

This application is a continuation of United States non-provisional application Ser. No. 12/947,753, entitled "Request Modification for Transparent Capacity Management in a Carrier Network", filed Nov. 16, 2010. The contents of application Ser. No. 12/947,753 are hereby incorporated by reference.

TECHNICAL FIELD

The present invention relates to systems and methods for maximizing carrier network capacity.

BACKGROUND ART

Much of the digital content that end users send and receive passes through various data networks that collectively form the Internet. End users gain access to these data networks through one or more carrier networks. Carrier networks include internet service providers (ISPs) that have provided dial-up connectivity and that now provide wired broadband connectivity (e.g., Digital Subscriber Line (DSL), cable, and fiber optic) through which end users access the Internet while at home or at the office. Carrier networks also include wireless carriers such as AT&T, Verizon, Sprint, and T-Mobile that provide wireless access to the Internet.

The wireless carriers have invested heavily in deploying wireless networks that are accessible by end users across multiple regions. FIG. 1 illustrates components of a wireless carrier network 105. As shown, the wireless carrier network 105 includes a radio access network (RAN) 110, a mobile switching center (MSC) 120, a Serving GPRS (General Packet Radio Service) Support Node (SGSN) 130, a Gateway GPRS Support Node (GGSN) 140, a Home Location Register (HLR) 150, and a set of databases 160.

The wireless carrier network 105 may include multiple RANs. In this figure, the RAN 110 is depicted as a UMTS (Universal Mobile Telecommunications System) Terrestrial Radio Access Network (UTRAN) that includes a Node B 170 and a Radio Network Controller (RNC) 180. The Node B 170 provides an air interface that spans several hundred meters. The Node B 170 generates a service region that allows one or more end user subscriber devices 190 that are located in the service region to wirelessly connect to circuit switched (i.e., voice) and packet switched (i.e., data) services of the wireless carrier network. A typical wireless carrier network includes multiple Node Bs for each RAN and multiple RANs to provide overlapping service regions that provide continuous wireless service.

The circuit switched services are provided by the MSC 120. The MSC 120 provides call switching and mobility management functionality to allow end user devices to place calls to the Public Switched Telephone Network (PSTN) 195.

The packet switched services are provided by the SGSN 130 and the GGSN 140. The SGSN 130 performs packet routing, mobility management, and authentication functionality within a particular geographic service region when the end user device requests data services through the wireless carrier network 105. The GGSN 140 provides interworking between the GPRS based data packets of the wireless carrier network 105 and Internet Protocol (IP) based data packets of external data networks such as the Internet.

The HLR 150 is one or more databases that store end user information. The HLR 150 identifies what services a particular end user has access to, location of the particular end user, and other end user subscriber account information. The set of databases 160 compliments the HLR 150 and provides additional information about end user parameters and network parameters. For example, the set of databases 160 stores information about the end users' devices (e.g., make and model) and the congestion at each Node B or RAN of the wireless carrier network.

Carrier networks, especially wireless carrier networks, are continually dealing with capacity issues in order to meet increased demand for their services. The increased demand comes in the form of new end users that previously did not have data access and new and more powerful end user devices that utilize the carrier networks' services to consume more feature-rich content such as videos, music, and other interactive content. These devices include smartphones (e.g., Apple's iPhone and other smartphones powered by the Android or Windows Phone 7 operating systems), tablet devices, and laptops or other computing devices with wireless connect cards that allow the devices to wirelessly access services of the carrier network.

Carrier networks are sometimes unable to keep up with the increase in demand. This is especially true for wireless carrier networks that have access to a limited wireless spectrum and are therefore much more limited in bandwidth than wired carrier networks. Consequently, end users may experience degraded or unavailable service. For example, some end users may be unable to connect to a wireless carrier network during peak usage hours. These end users will be unable to access wireless data services. This situation is further exacerbated by end users with unlimited access plans that can disproportionally consume the carrier network's bandwidth.

Some carrier networks have introduced monthly caps on data usage in an attempt to limit end user content consumption. However, these caps do not improve the capacity of the carrier network during times of peak usage when the number of end users accessing the carrier network's services exceeds the available capacity or in major metropolitan areas where the number of end users in a particular service region exceeds the available capacity at that particular service region. Upgrading existing infrastructure imposes significant costs on the carrier network. For example, upgrading from a 3G to a 4G (Worldwide Interoperability for Microwave Access (WiMAX) or Long Term Evolution (LTE)) data network takes several years and hundreds of millions in cost to rollout.

Accordingly, there is a need to better utilize the existing resources of a carrier network to maximize the available capacity of a carrier network. There is a need to do so without modifying existing equipment and existing configurations of the carrier networks so that implementation, maintenance, and integration costs are minimized.

SUMMARY OF THE INVENTION

Some embodiments provide a capacity management agent that seamlessly integrates with existing components of a carrier network and that improves the capacity of the carrier network. The capacity management agent also enables the carrier network to better monetize underutilized resources, provide quality of service controls, and provide parental controls.

In some embodiments, the capacity management agent improves carrier network capacity by modifying user content requests that are submitted through the carrier network. The modifications are made to adjust the amount of bandwidth that is consumed when streaming the requested content from the content provider to the requesting end user. The modifications to the end user content requests are based on carrier network condition parameters, end user parameters, or both. In some embodiments, the modifications include modifying a Uniform Resource Locator (URL) that is associated with the end user request or a query string of the URL that is associated with the end user request. In some embodiments, the modifications include modifying header information of the packet that is associated with the end user request.

The modifications specify various quality settings and bitrate encodings for the content that is being requested. The modifications can also specify settings that optimize content playback on a particular end user device. In some embodiments, the modifications populate various data field in the content request with values in order to reduce message exchanges between end users and content providers.

In some embodiments, the capacity management improves carrier network capacity by modifying the bandwidth that is allocated between each end user and the carrier network. Specifically, the capacity management agent caches requested content that is streamed from a content provider at a first rate and the capacity management agent provides the content to the requesting end user through the carrier network at a second rate. In some embodiments, when the available resources at the service region in which the requesting end user is located are less than a specified threshold, the second rate at which content is provided to the end user is less than the first rate thereby conserving resources of the carrier network. In some embodiments, when the available resources at the service region in which the requesting end user is located are greater than a specified threshold, the second rate at which content is provided to the end user is greater than the first rate to ensure that the resources do not remain underutilized and so that the carrier network can bill for the usage of the resources. Accordingly, bandwidth modification may be used to ensure proportional bandwidth consumption between end users that are utilizing the carrier network's services, better monetize the carrier network's underutilized resources, and provide quality of service controls.

BRIEF DESCRIPTION OF THE DRAWINGS

In order to achieve a better understanding of the nature of the present invention, a preferred embodiment of the capacity management agent will now be described, by way of example only, with reference to the accompanying drawings in which.

DETAILED DESCRIPTION

Figure 1:
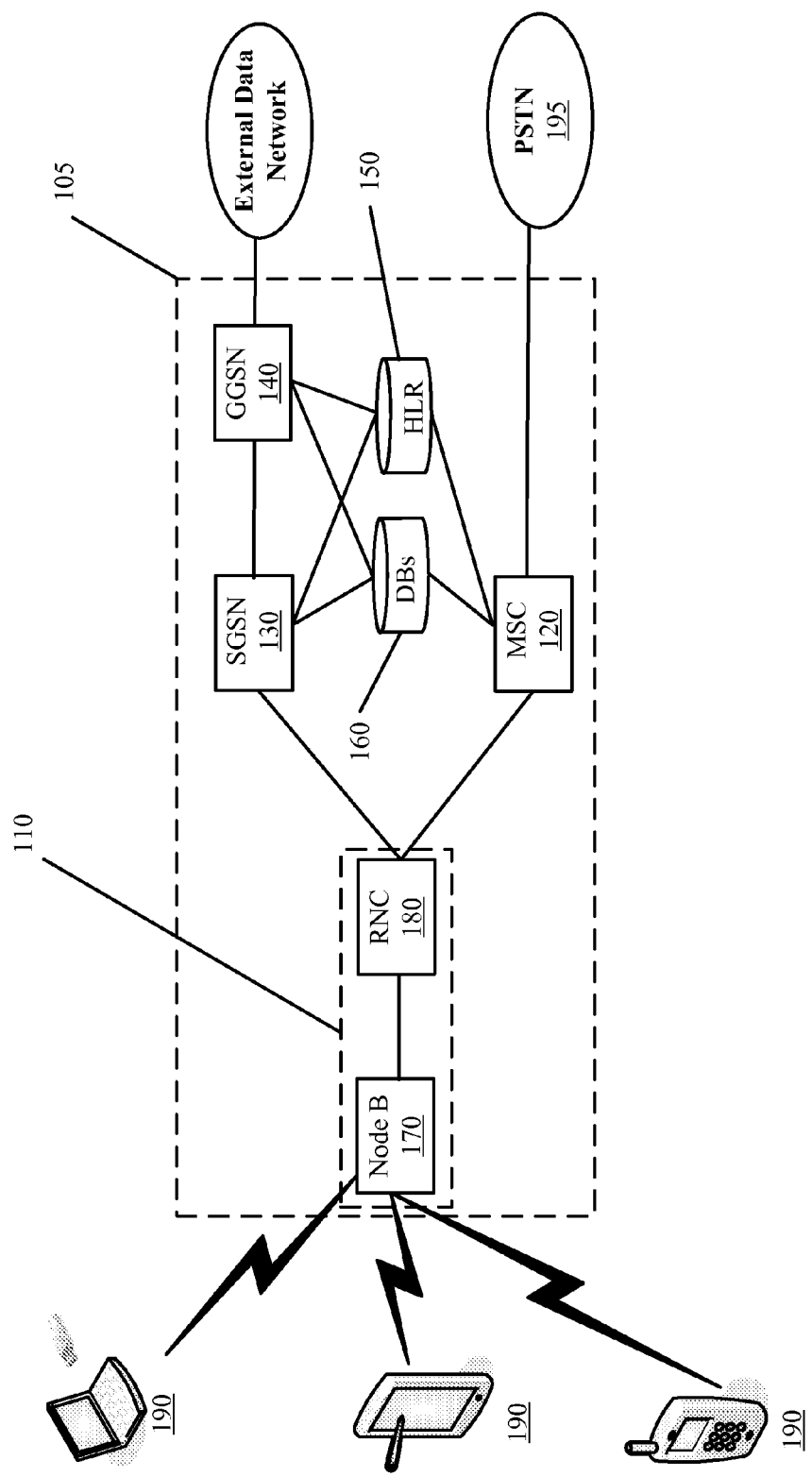
FIG. 1 illustrates components of a wireless carrier network.

In the following detailed description, numerous details, examples, and embodiments of a capacity management agent that transparently improves capacity for a carrier network is set forth and described. It will be clear and apparent to one skilled in the art that the capacity management agent is not limited to the embodiments set forth and that the capacity management agent may be practiced without some of the specific details and examples discussed.

I. Overview

Some embodiments provide a capacity management agent for a carrier network. The capacity management agent operates to transparently improve the capacity of the carrier network. This allows for greater simultaneous usage of the carrier network without having to upgrade the existing infrastructure or resources of the carrier network. The capacity management agent seamlessly integrates with the existing components of the carrier network. In some embodiments, the carrier network is a wireless carrier network that provides end users with wireless access to data networks such as the Internet. However, it should be apparent to one of ordinary skill in the art that the systems and methods provided below are applicable to any carrier network.

In some embodiments, the capacity management agent improves the capacity of the carrier network by modifying end user content requests that are submitted through the carrier network. The modifications adjust the amount of bandwidth that is consumed when the requested content is streamed from the content provider through the carrier network to the requesting end user. The content provider is the entity that hosts the requested content on its servers. The capacity management agent does not alter the content once streaming has commenced from the content provider. Furthermore, the modifications are transparently performed in a manner that does not affect the operation of the carrier network, end users, or content providers.

The modifications to the end user content requests are based on carrier network condition parameters, end user parameters, or both. In some embodiments, carrier network condition parameters specify load, a measure of resource usage, number of active users, and other conditions at a particular Point of Presence (POP) of the carrier network. In some embodiments, the measure of resource usage includes a measure of bandwidth usage, a measure of load, a measure of active users, or some other measure of congestion. For a wireless carrier network, a POP includes a service region that is generated by a cellular tower such as Node B. In some embodiments, end user parameters specify the device that is used by the end user, the supported display resolution of the end user device, and the end user subscriber information as some examples.

In some embodiments, the capacity management agent modifies a Uniform Resource Locator (URL) that is associated with an end user request or a query string of the URL that is associated with the end user request. In some embodiments, the modifications include modifying header information of at least one packet that is associated with an end user request.

The modifications set various configurable parameters for the content that is being requested. For example, these configurable parameters include content quality settings (e.g., resolution, encoding rate, etc.), settings that optimize content playback for a particular end user, and values used in populating data fields that are associated with the content that is being requested.

In some embodiments, the capacity management agent improves the capacity of the carrier network by dynamically and transparently adjusting the bandwidth that is allocated between an end user and the carrier network based on changing network conditions. To do so, the capacity management agent intercepts requested content that is streamed from a content provider and that is intended for the carrier network. The requested content is passed at a first rate from the content provider. The capacity management agent caches the content and provides the cached content to the appropriate requesting end user through the carrier network at a bandwidth limited second rate.

In some embodiments, the capacity management agent provides quality of service (QoS), redirection, and parental controls to improve the capacity of the carrier network. In some embodiments, the QoS controls allow the carrier network to ensure that unlimited access end users do not disproportionately consume carrier network resources. Unlimited access end users include those end users that pay a flat fee to access unlimited amounts of data. This is in contrast to pay-per-access users that pay a certain amount for each unit of accessed data (e.g., each megabyte). Moreover, the QoS controls allow for better monetization of the available bandwidth by providing pay-per-access end users a higher level of service as compared to unlimited usage end users. When performing redirection, the capacity management agent improves the capacity of the carrier network by reducing the number of message exchanges that are needed to satisfy a particular end user content request. In so doing, the capacity management agent frees bandwidth that would otherwise be consumed in performing the extraneous message exchanges. When performing parental controls, the capacity management agent restricts illicit, lewd, or other unapproved content from passing through the carrier network to the service regions, thereby freeing bandwidth for other approved uses. Also when performing parental controls, the capacity management agent may monitor end user usage and limit bandwidth usage for an end user that is a member of a group or family plan and that is disproportionately consuming bandwidth for the group or where the usage for the group exceeds an allotment threshold.

II. Capacity Management Agent

Figure 2:
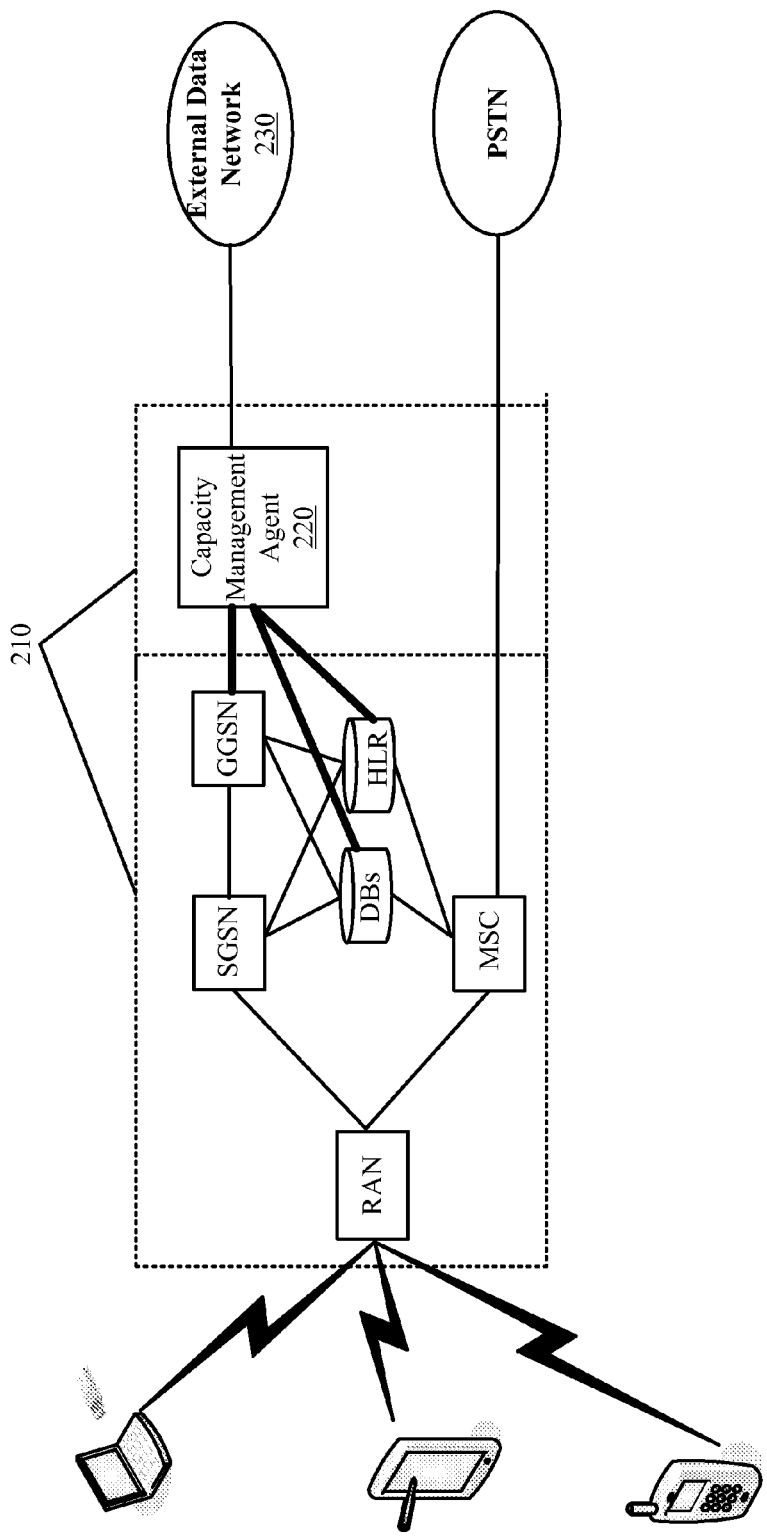
FIG. 2 illustrates a carrier network operating with a capacity management agent of some embodiments.

FIG. 2 illustrates a carrier network 210 operating with a capacity management agent 220 of some embodiments. The capacity management agent 220 may be part of the carrier network 210 or external to the carrier network 210. The capacity management agent 220 may be operated by the carrier network 210 or by a third party operator such as a Content Delivery Network (CDN). In some embodiments, the capacity management agent 220 transparently operates with the existing carrier network 210 by intercepting content requests that pass from the carrier network 210 to an external data network 230. In some embodiments, the capacity management agent 220 operates on IP based traffic and is therefore positioned in proximity to the packet switching components of the carrier network 210 such as the GGSN. Content requests include HyperText Transfer Protocol (HTTP) GET messages. In some embodiments, the capacity management agent 220 intercepts downstream traffic that passes from the external data network 230 to the carrier network 210.

The capacity management agent 220 includes a rules engine that specifies various processes for modifying content requests and for dynamically adjusting bandwidth. The rules engine is executed using computing resources of a server. The server may include a physical computing machine with a processor, memory, storage, and network connectivity. Alternatively, the server may include a virtual machine that is run on an existing computing machine of the carrier network 210, wherein each virtual machine is provided exclusive or shared access to a particular set of computing resources (e.g., processor, memory, storage, etc.) of the machine. In some embodiments, the functionality of the capacity management agent is integrated as one or more virtual machines that execute on packet switching components (i.e., GGSN) of the carrier network. In some embodiments, the capacity management agent 220 also includes one or more databases for storing rules for the rules engine, for storing arguments that are used to modify content requests for different content providers, and for storing a local copy of data that is stored within the databases of the carrier network 210 (e.g., end user device information, end user service subscription information, etc.).

Though FIG. 2 shows one capacity management agent 220 for the carrier network 210, it should be apparent to one of ordinary skill that the carrier network 210 can include multiple capacity management agents at different locations of the carrier network at which traffic passes from the carrier network 210 to the external data network 230. Moreover, multiple capacity management agents may operate at a single location in a load balanced manner of operation.

A. Content Request Modification

In the carrier network, streaming content often consumes the majority of the available bandwidth. Streaming content includes video, audio, and interactive content such as video games. When an end user requests a particular content stream from a content provider, a default encoding of the stream is returned from the content provider. The default encoding specifies a particular bitrate for the content. This bitrate consumes a certain amount of bandwidth of the carrier network which reduces the available resources and capacity of the carrier network. The greater the bitrate for the streaming content, the larger the impact to the resources and capacity of the carrier network.

In many cases, the content provider stores multiple encodings for the same content. Each encoding specifies a different bitrate that alters the amount of bandwidth that would be consumed when streaming the content to the end user. Therefore, to conserve the carrier network bandwidth and thereby increase the carrier network capacity, the capacity management agent intercepts and modifies the end user submitted request to explicitly request a lower quality encoding of the requested content stream than the default encoding. In response to the modified content request, the content provider streams the requested content using an encoding that consumes less bandwidth than the default encoding that would otherwise be provided by the content provider.

Less bandwidth and therefore less capacity of the carrier network is consumed in delivering the content in response to the modified content request. Moreover, bandwidth usage is reduced without the capacity management agent or the carrier network transcoding or processing the stream as it is passed from the content provider through the carrier network to the end user.

In some embodiments, providing the lower quality encoding improves the user experience. For example, the wireless carrier may provide a certain limited amount of bandwidth per end user that is insufficient to support streaming of high quality content. As a result, buffering occurs at the end user device which creates an interrupted user experience. However, by modifying the content request to specify lower quality content, the user is less likely to experience buffering thereby improving the user experience. As another example, many wireless devices that are used to access streaming content from a wireless carrier network have low resolution displays. These low resolution displays are often unable to display the resolution specified within the default encoding of the requested content stream. Accordingly, no quality is lost when modifying the end user content request to request a lower quality encoding of the content. The lower quality encoding utilizes less processing resources of the end user device, allowing for smoother playback and lower power consumption. The end user device avoids having to perform processor intensive operations to downscale and process the greater amount of data that is encoded in a higher quality encoding. Accordingly, by streaming less data to the end user device, the end user device can begin displaying the content sooner, with less buffering, and with less interruption.

In some embodiments, the capacity management agent modifies end user content requests based on carrier network condition parameters. As noted above, these condition performance parameters specify load, resource usage, number of active users, and other conditions at a particular POP of the carrier network. For a wireless carrier network, a POP includes a service region that is generated by a cellular tower such as Node B. The capacity management agent retrieves the condition parameters from the databases of the carrier network. For example, the HLR database 150 and the set of databases 160 of FIG. 1. The capacity management agent is configured with access to these databases and the agent periodically pulls the condition parameters from the databases. In some embodiments, the condition parameters serve as inputs to the rules engine of the capacity management agent. The rules engine executes various processes to determine whether to and how to modify content requests. In some embodiments, content requests from a particular POP of a carrier network are modified when that particular POP experiences high load and capacity at that POP becomes limited as a result. For example, the capacity management agent modifies content requests that come from a particular POP when 90% of the resources at that particular POP are utilized.

Figure 3:
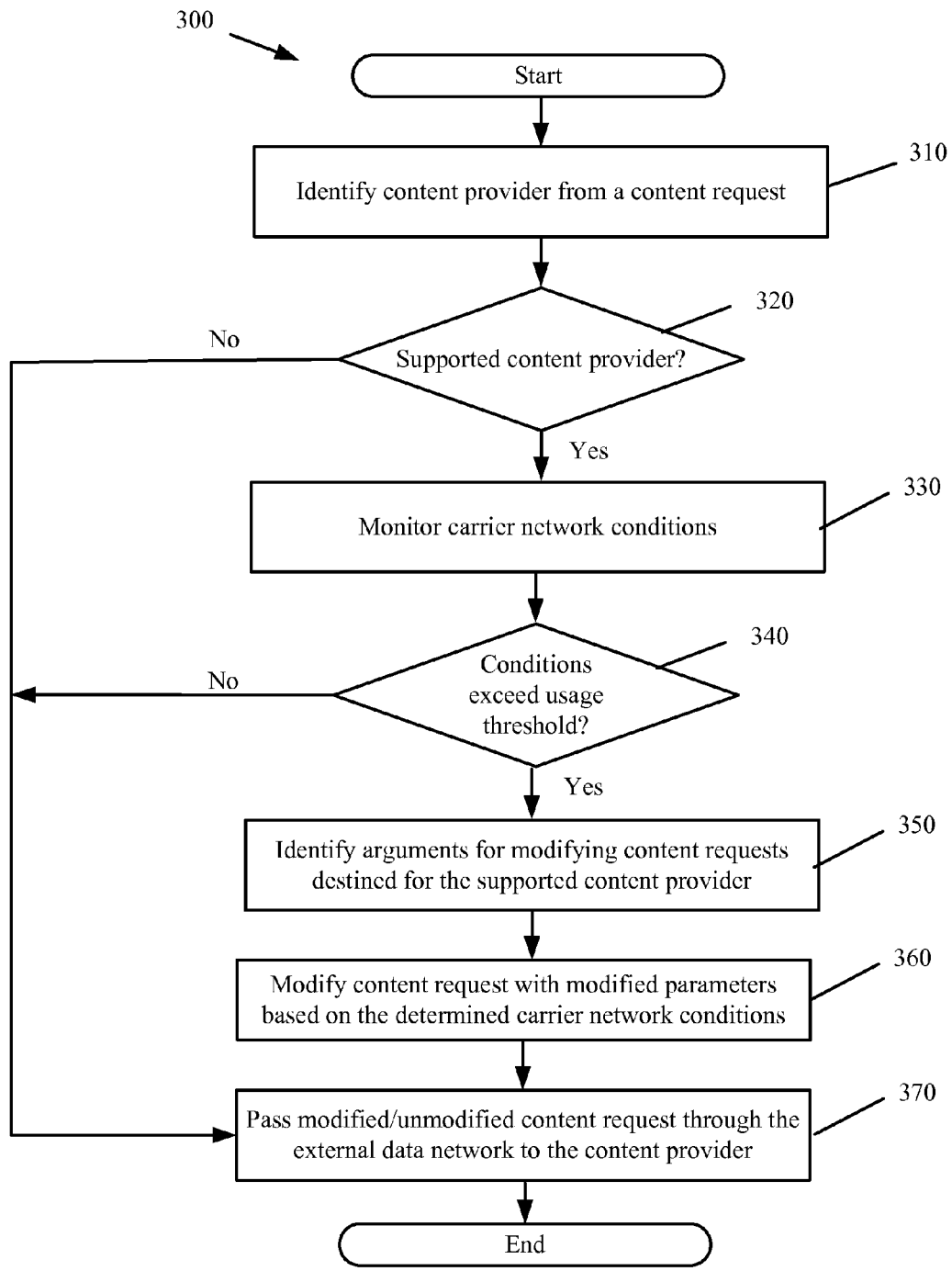
FIGS. 3 and 4 present processes performed by the capacity management agent to dynamically modify end user content requests based on carrier network condition parameters in accordance with some embodiments.

FIG. 3 presents a process 300 performed by the capacity management agent to modify end user content requests based on carrier network condition parameters in accordance with some embodiments. The process 300 begins when an end user submits a content request through the carrier network and the capacity management agent intercepts the request as it is passed from the carrier network to an external data network.

The process analyzes the content request to identify (at 310) a content provider from which content is being requested. The content provider is identified by analyzing the URL that is provided in the content request. In some embodiments, the content provider is identified from the domain, hostname, or entire URL that is provided in the content request. For example, a content request for a YouTube video specifies the "www.youtube.com" domain. The process determines (at 320) whether the identified content provider is a content provider that supports request modification. A list of supported content providers is configured in the rules engine of the capacity management agent by the capacity management agent administrator or carrier network administrator. The configured list is stored as a set of records to a computer readable storage medium of the capacity management agent. The process performs a lookup of the identified content provider against the configured list to make the determination.

When the identified content provider does not support modified content requests, the process passes (at 370) the content request through to the external data network without modification. From the external data network, the content request is routed to the identified content provider.

When a content provider that supports content request modification is identified (at 320), the process monitors (at 330) the carrier network conditions to determine whether content request modification is necessary. As noted above, the carrier network conditions are retrieved from one or more databases of the carrier network. The conditions identify whether the particular carrier network POP at which the content request originates is congested (i.e., running low on available capacity) and whether the content request should be modified in order to reduce resource consumption. In some embodiments, the conditions also identify whether neighboring POPs are congested in order to account for end user mobility and handover between POPs. The process determines (at 340) whether the retrieved conditions exceed a usage threshold. As a simplified example, the usage threshold may specify 10% available bandwidth at the particular POP and when the available bandwidth falls below 10%, the process modifies content requests in order to conserve bandwidth at the particular POP and thereby improve the capacity of the carrier network.

When the retrieved conditions do not exceed the usage threshold, the process passes (at 370) the content request through to the external data network without modification. Otherwise, the process identifies (at 350) what arguments can be used to modify the content request. As will be discussed in greater detail below, these arguments can be added to the query string of the content request URL or can be inserted into the header of the content request packet to modify the content request. Different content providers utilize different arguments. Therefore, the rules engine is configured with different arguments for different content providers. The arguments are stored to the computer readable storage medium of the capacity management agent. The process modifies (at 360) the content request with the arguments that are identified at 350 based on the determined carrier network conditions. In this case, the process passes (at 370) the modified content request through the external data network to the content provider and the process ends. In some embodiments, the modified content request causes the content provider to return the requested content at a lower quality setting (e.g., reduced bitrate or lower resolution) that consumes fewer resources of the carrier network.

Figure 4:
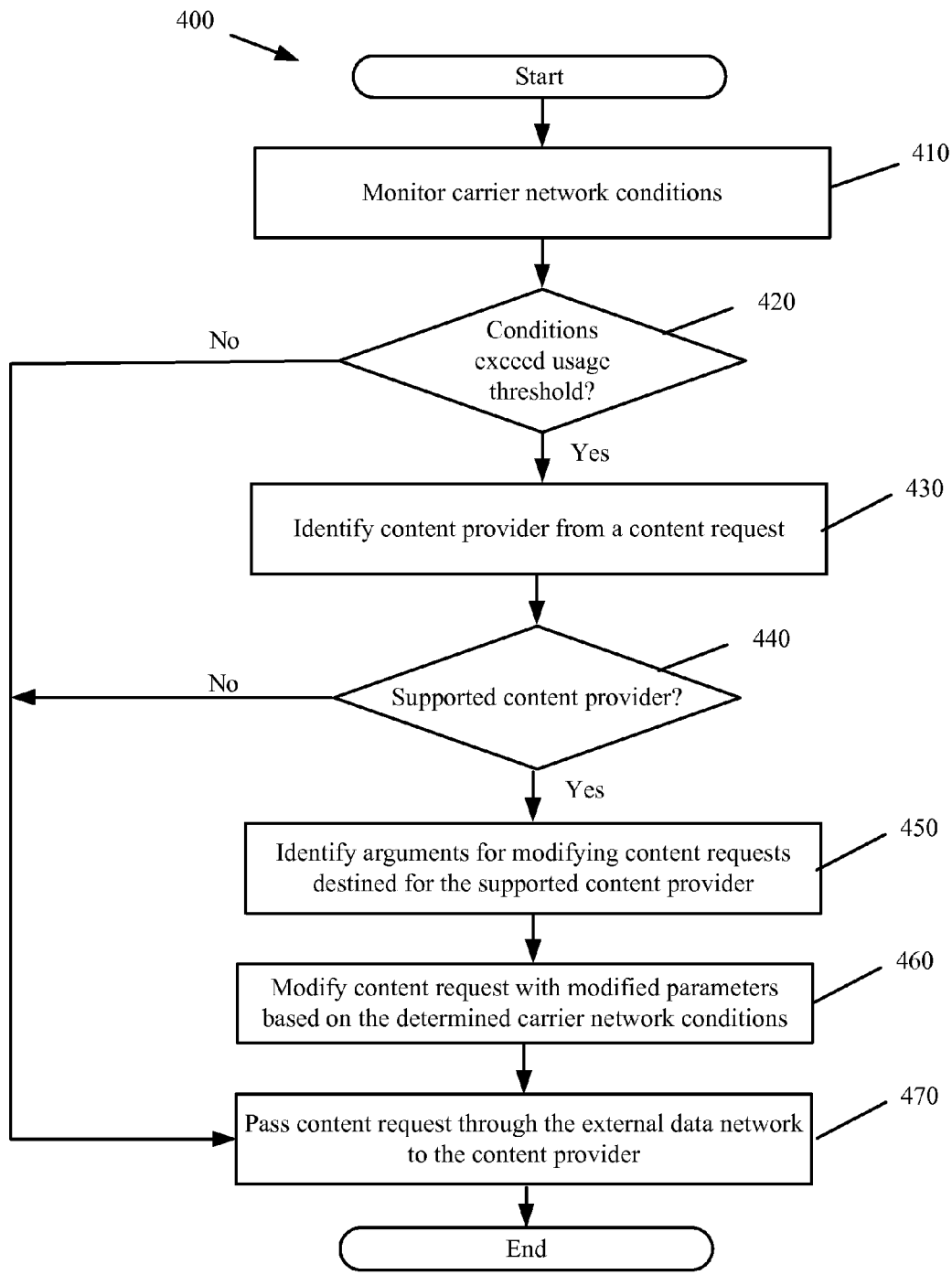

It should be apparent to one of ordinary skill in the art that the order in which process 300 is performed may be modified without affecting the operation of the process 300. For example, FIG. 4 presents a similar process to that of FIG. 3 in which steps 310 and 320 are performed after steps 330 and

340. Accordingly, in FIG. 4, the process monitors (at 410) the carrier network condition parameters to determine (at 420) whether the conditions exceed a threshold before identifying whether the content provider is one that supports request modification at steps 430 and 440.

Figure 5:
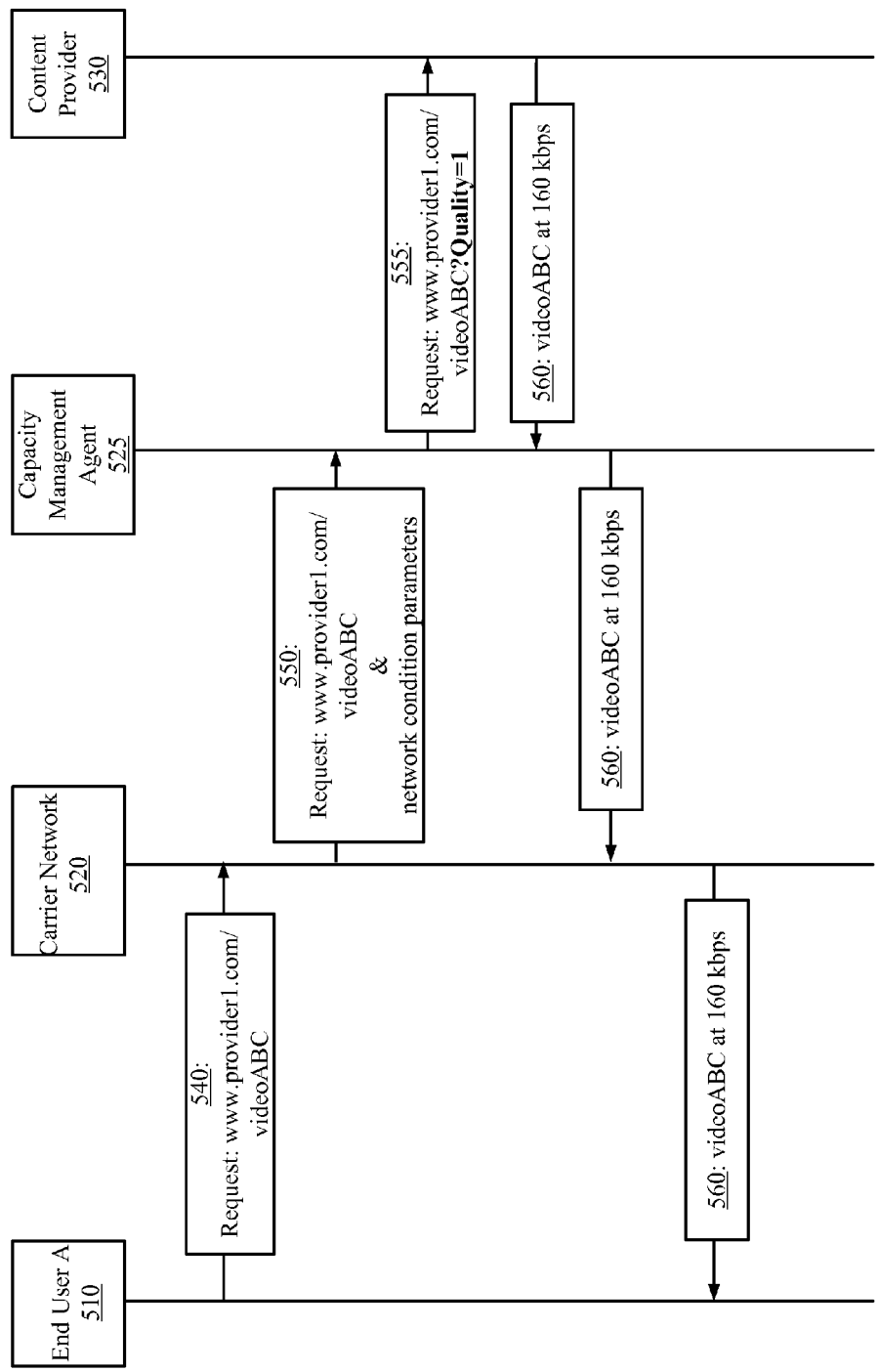
FIG. 5 presents a message exchange for modifying a content request to conserve carrier network resources in accordance with some embodiments.

FIG. 5 presents a message exchange for modifying a content request to conserve carrier network resources in accordance with some embodiments. The figure includes an end user 510, carrier network 520, capacity management agent 525, and content provider 530. The message exchange begins when the end user 510 communicatively couples to a service region of the carrier network 520 and the end user 510 submits (at 540) a request for content of the content provider 530 in an external data network. As shown, the end user 510 requests a video stream entitled "videoABC" from the www.provider1.com content provider 530. The request is received (at 540) at the carrier network 520. In this figure, it is assumed that the service region in which the end user 510 is located is congested.

The carrier network 520 forwards the request to the content provider 530 through an external data network. However, before being routed through the external data network, the capacity management agent 525 intercepts (at 550) and analyzes the request to determine whether the request should be modified as per the process 300 of FIG. 3 or some similar process. The capacity management agent 525 receives (at 550) network condition parameters that report on the condition of the carrier network. Specifically, the network condition parameters identify that the service region from which the request originates is congested and that resources at that service region are below an available usage threshold. Therefore, the capacity management agent 525 modifies the content request before sending it to the content provider 530 through the external data network.

In this figure, the content request is modified by appending a quality setting argument to the query string of the URL. Specifically, the query string is modified to include "?Quality=1". This argument specifies a low quality setting for the video stream that is returned by the content provider 530 and overrides a higher quality default setting (e.g., Quality=5) for the video stream that would otherwise have been returned by the content provider when such an argument is omitted from the query string.

When the content provider 530 receives the modified request, the content provider 530 returns (at 560) the low quality stream for the requested "videoABC" video instead of the default higher quality stream. The stream passes from the content provider 530 to the capacity management agent 525, from the capacity management agent 525 to the carrier network 520, and from the carrier network 520 to the end user 510 without any further modifications or processing by the capacity management agent 525. The modification is transparently performed by the capacity management agent 525 as the end user 510 and the carrier network 520 are unaware of the modification to the content request. Additionally, the modification occurs without changes to the operation or configuration of the carrier network 520. The resources are conserved even when the end user 510 is handed over from the congested service region to another service region.

It should be apparent to one of ordinary skill in the art that different content providers utilize different query string arguments to specify quality settings. Accordingly, the capacity management agent modifies the query differently for different content providers. For example, to specify a quality setting for a www.youtube.com video, the capacity management agent appends the "&fmt=X" query string argument to the content request URL where the "X" represents a quality setting value for the requested video.

In some embodiments, the capacity management agent modifies the header of the content request packet in order to specify various arguments for the content that is to be returned by the content provider. The packet header modification may be performed in addition to or instead of the query string modification presented above.

In some embodiments, the packet header modification may be performed using "X-headers". X-headers are non-standard headers that can be inserted into an HTTP header or other headers of the content request packet. Different content providers may support different X-headers. Accordingly, the rules engine of the capacity management agent is configured with the supported X-headers for a particular content provider. These supported header arguments are stored to the computer readable storage medium of the capacity management agent.

The example below illustrates an HTTP header with various standard header fields:

Host: www.examplehost.com
User-Agent: Mozilla/5.0 (Linux x86_64; en-US; rv:1.9.2.11)
Firefox/3.6.11
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 115
Connection: keep-alive
Cookie: simple=165145323.2009124443
Cache-Control: max-age=0

The capacity management agent can modify such a header to include a quality setting field that is used by a particular content provider to select the bitrate or encoding for the content being requested. The example below illustrates an HTTP header that is modified with a X-header field for specifying a quality setting for a video stream that is to be returned by the particular content provider:

Host: www.examplehost.com
User-Agent: Mozilla/5.0 (Linux x86_64; en-US; rv:1.9.2.11)
Firefox/3.6.11
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 115
Connection: keep-alive
Cookie: simple=165145323.2009124443
Cache-Control: max-age=0
X-Quality: 1

In the above modified header, the capacity management agent introduced the "X-Quality: 1" field to specify the quality setting for the content being requested.

In some embodiments, modifying the content request (i.e., modifying query strings or packet headers) improves the capacity of the carrier network by automatically populating the content request with data that reduces the number of messages that are exchanged between an end user and a content provider. For example, an end user may access a website that locates restaurants within a specified region. The end user first submits a request for and receives the homepage in which the end user can enter his location information. The end user then submits a second request that includes his location information to the content provider and the content provider responds with a second page that displays the restaurants that are closest to the end user. The capacity management agent can leverage the information within the carrier network databases to perform the above example in a single message exchange. In so doing, the carrier network avoids passing the homepage the second content request thereby saving bandwidth and improving capacity.

Figure 6:
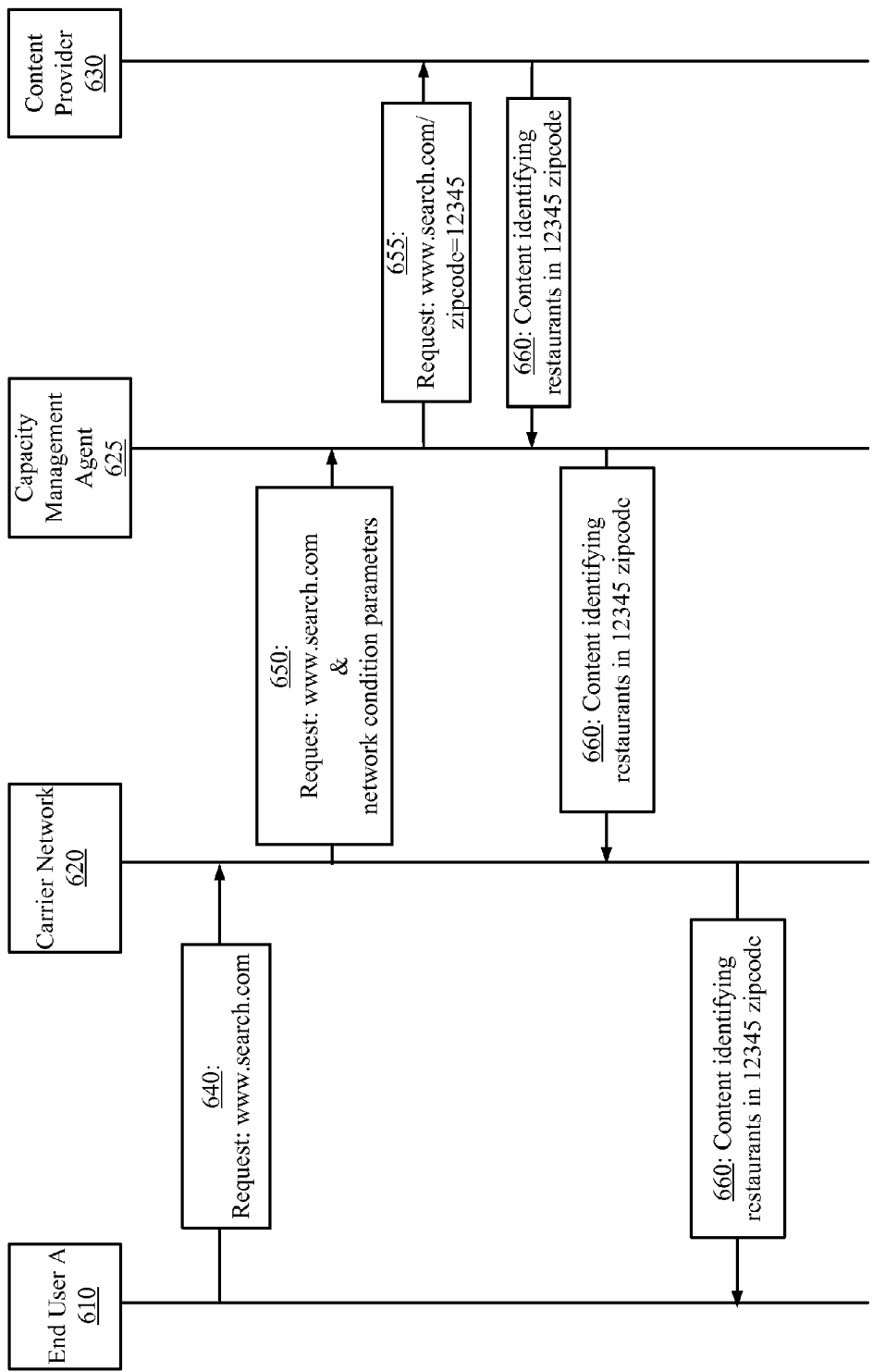
FIG. 6 illustrates using the capacity management agent to improve capacity of the carrier network by modifying content requests to include automatically populated data in accordance with some embodiments.

FIG. 6 illustrates using the capacity management agent to improve capacity of the carrier network by modifying content requests to include automatically populated data in accordance with some embodiments. FIG. 6 includes an end user 610, carrier network 620, capacity management agent 625, and content provider 630. In this figure, it is assumed that the service region in which the end user is located 610 is congested.

The end user 610 submits (at 640) a content request to the content provider 630 that identifies restaurants in an area. The content request is forwarded from the end user 610 to the carrier network 620. The capacity management agent 625 receives (at 650) the content request from the carrier network 620. The capacity management agent 625 also receives network condition parameters that include the location of the requesting end user 610. In some embodiments, the location is determined by identifying the service region from which the request originates.

The capacity management agent 625 identifies the content provider 630 from the content request. The capacity management agent 625 is configured with a set of rules that specify arguments that are inserted to the query string or header of the content request for the identified content provider 630. In this figure, the capacity management agent 625 inserts location information for the end user 610 into the query string in a format that is supported by the content provider 630. However, it should be apparent that the location information may also be inserted as a query string argument into a URL in some embodiments. The modified content request is then passed (at 655) to the content provider 630. Rather than return the homepage as was specified by the end user 610 in the original content request, the content provider 630 provides (at 660) content that identifies restaurants within the surrounding area of the end user 610. This improves the end user experience as the end user obtains desired information in fewer transactions. This also improves the capacity of the carrier network by reducing the traffic that is sent to and received from the end user. Similar operation can be leveraged for other such sites. For example, when an end user requests a mapping site for directions, the starting location of the end user can be obtained from the HLR database of the carrier network and automatically populated in the content request before it is passed to the mapping content provider.

Figure 7:
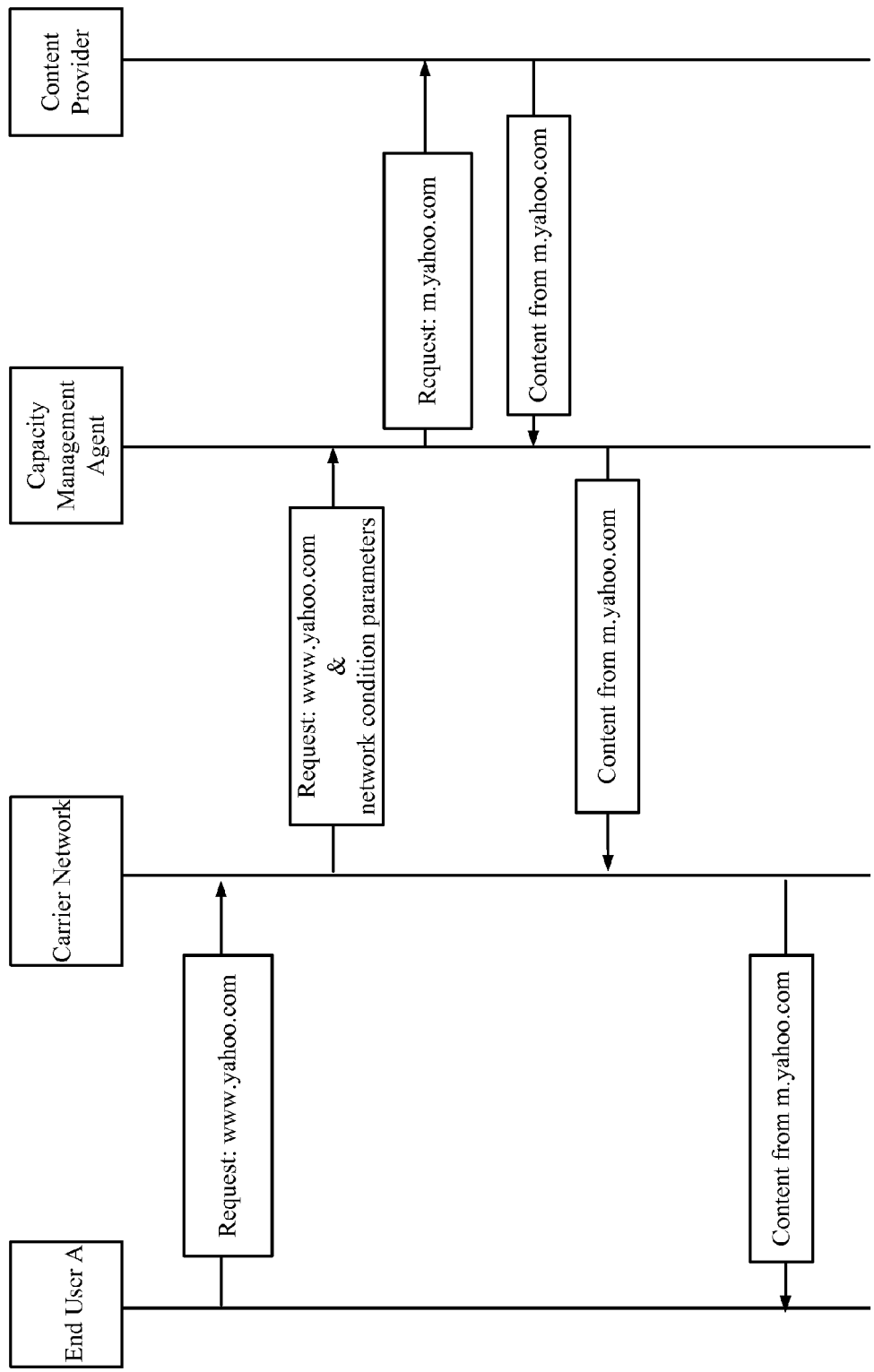
FIG. 7 illustrates modifying end user submitted content requests to automatically redirect the end user to an appropriate site in accordance with some embodiments.

In some embodiments, the capacity management agent improves the capacity of the carrier network by modifying content requests to automatically redirect end users to an appropriate site. In so doing, the capacity management agent reduces the number of message exchanges that would otherwise occur in order to redirect the end users. This often occurs when end users that use portable wireless devices request a particular website from a content provider and the content provider redirects the end users to a mobile version for that website. For example, when requesting the www.yahoo.com website, an end user that submits such a request from a smartphone is provided a redirection link to the m.yahoo.com website. The end user then submits a second request for the m.yahoo.com before being provided the content from the appropriate site. By modifying the content request at the capacity management agent, the second message exchange is eliminated. FIG. 7 illustrates modifying end user submitted content requests to automatically redirect the end user to an appropriate site in accordance with some embodiments.

In some embodiments, the capacity management agent improves the capacity of the carrier network based on end user parameters. End user parameters include the device used by the end user to submit a request, the supported display resolution of the end user device, and the end user subscriber information (e.g., demographic information, subscribed services, etc.) as some examples. Such information is available and can be pulled from the databases of the carrier network. In some embodiments, the capacity management agent uses this information to optimize the modifications that are made to the end user requests. Specifically, by identifying the end user device or its display resolution, the capacity management agent can modify the end user submitted content request to select a video stream that is optimal for display on the user device.

As noted above, providers of streaming content often return a requested content stream with a default quality setting irrespective of what device the stream is to be displayed on. For a wireless carrier network, many end users request content using smartphones. Some smartphones have a maximum display resolution of 320×240 pixels. Accordingly, bandwidth is wasted when streaming content at a display resolution of 640×480 to such an end user. Moreover, the end user experience is detrimentally affected since the end user device processes the stream to downscale it to the 320×240 resolution. Such downscaling is processor intensive and may result in interrupted playback of the stream. Additionally, processor intensive tasks such as downscaling drain the battery of the device. Lastly, playback can be interrupted as repeated buffering can occur if sufficient bandwidth is not available to stream the higher quality stream.

Figure 8:
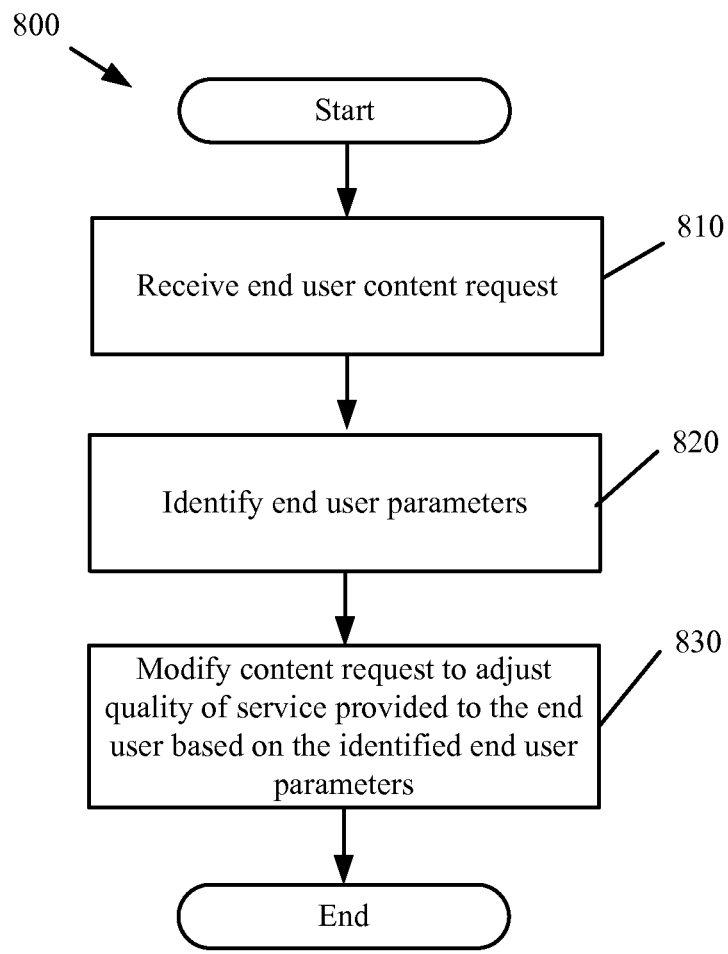
FIG. 8 presents a process performed by the capacity management agent to modify a content request based on end user parameters.

However, by modifying the content request with end user parameters, the returned content can be optimized to improve carrier network capacity while also improving the user experience. FIG. 8 presents a process 800 performed by the capacity management agent to modify a content request based on end user parameters in accordance with some embodiments. This process 800 can be performed in conjunction with or independent of process 300 described above.

The process begins when the capacity management agent receives (at 810) an end user submitted request. The process identifies (at 820) parameters for the end user that submits the content request. These parameters are identified by querying the databases of the carrier network with one or more identifiers for the requesting end user (e.g., Subscriber Identity Module (SIM), IP address, session identifier). For example, the end user device information can be obtained from a subscriber database of the carrier network such as the HLR. In some embodiments, a copy of the information from the carrier network databases is stored locally at the capacity management agent. In some such embodiments, the end user parameters can be obtained more efficiently without the need to submit queries to the databases of the carrier network.

Next, the process modifies (at 830) the received content request based on the end user parameters. As presented above, the modifications may include inserting query string arguments into the URL that is associated with the content request. The modification may also include inserting header fields into the header of the content request packet. In the example below, end user demographic information and device information are inserted into an HTTP header of the end user content request:

```
Host: www.examplehost.com
User-Agent: Mozilla/5.0 (Linux x86_64; en-US; rv:1.9.2.11)
Firefox/3.6.11
Accept: text/html,application/xhtml+xml,application/xml;q=0.9,*/*;q=0.8
Accept-Language: en-us,en;q=0.5
Accept-Encoding: gzip,deflate
Accept-Charset: ISO-8859-1,utf-8;q=0.7,*;q=0.7
Keep-Alive: 115
Connection: keep-alive
Cookie: simple=165145323.2009124443
Cache-Control: max-age=0
X-Demographic: gender=Male;age_range=18-39;zip=90405
X-Handset: Droid X
X-Resolution: 854x480
```

It should be apparent to one of ordinary skill in the art that the capacity management agent may be configured with rules that cause the capacity management agent to perform the above modification for specified domains or content providers. Different modifications may be made for different domains or content providers. Additionally, the modifications may be performed when a usage threshold at a POP from which the request originates is met or exceeded. In some embodiments, the modifications based on carrier network condition parameters take precedence over the modifications that are based on the end user parameters. In some embodiments, the modifications based on the end user parameters are used to optimize the modifications that are made based on the carrier network condition parameters.

Figure 9:
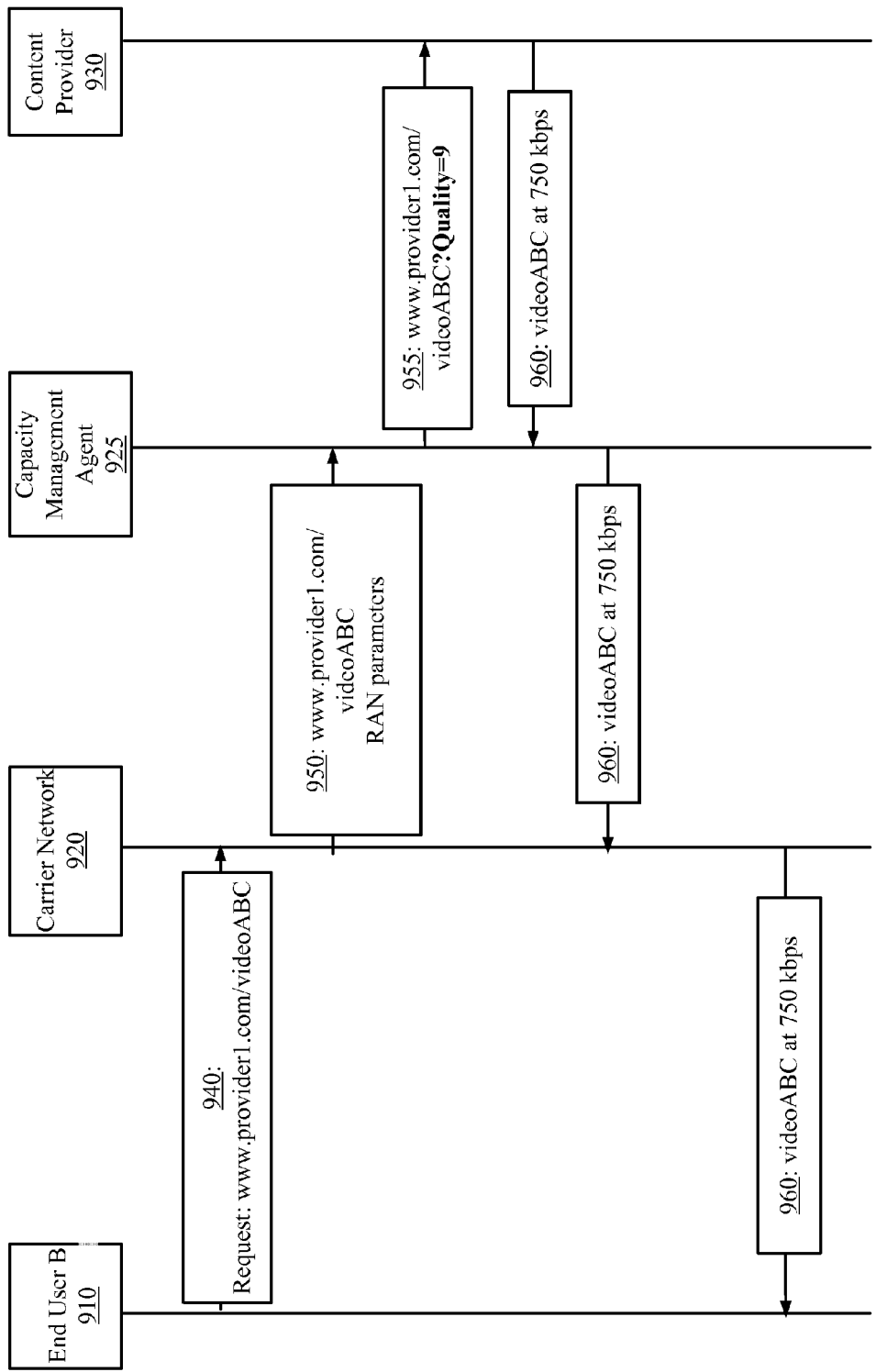
FIG. 9 illustrates using the capacity management agent to better monetize the carrier network resources.

In addition to or instead of improving carrier network capacity, the content request modifications that are performed by the capacity management agent may be used to better monetize the carrier network resources, provide QoS, and provide parental controls. FIG. 9 illustrates using the capacity management agent to better monetize the carrier network resources.

FIG. 9 includes an end user 910, carrier network 920, capacity management agent 925, and content provider 930. In this figure, it is assumed that the end user 910 is located in an uncongested service region where the resources of the service region are underutilized. It is also assumed that the end user 910 is a pay-per-access user that pays for each megabyte of data that is downloaded from the carrier network. For these pay-per-access end users, the carrier network prefers increasing the amount of data that is streamed to the end user 910 when the resources of the service region in which the end user is located are underutilized. This is so that the available resources do not remain idle and so that the carrier network can bill for the end user's 910 usage of these resources. Accordingly, the capacity management agent is configured to modify the content request so that a stream that is higher in quality than a default stream is returned to the user from a content provider.

As shown, the end user 910 requests (at 940) the videoABC stream from the www.provider1.com content provider. The request is received at the carrier network 920. The carrier network 920 passes the request to an external data network. The capacity management agent 925 intercepts (at 950) the request before it is passed to the external data network. The capacity management agent 925 also retrieves carrier network condition parameters for the service region and end user parameters. The carrier network condition parameters identify that the available resources at the servicer region in which the request originates are above a certain threshold indicating that the resources of that service region are underutilized. For example, the resources at the service region are less than 60% utilized. The end user parameters identify the end user 910 as a pay-per-access end user.

Based on the carrier network condition parameters, the capacity management agent 925 identifies that the resources at the service region can be better monetized by modifying the content request to pass a higher quality stream to the end user 910. Accordingly, the capacity management agent 925 modifies the content request query string by appending the quality setting argument to the query string and setting the value for the argument to specify a high quality stream. In this figure, the modified content request includes the query string argument "?Quality=9". The capacity management agent 925 passes the modified content request to the content provider 930 through the external data network. The content provider then returns (at 960) the videoABC stream at a bitrate that consumes 750 kbps in contrast to the low quality bitrate of the videoABC stream that was returned in FIG. 5 and that consumed 160 kbps.

Similar operation of the capacity management agent can be used to provide QoS functionality. Specifically, the capacity management agent can be configured to modify content requests from unlimited usage end users to request lower quality streams and to modify content requests from pay-per-access end users to request higher quality streams. In so doing, a first QoS is provided to the unlimited usage end users and a second QoS is provided to the pay-per-access end users.

In some embodiments, the capacity management agent is configured to provide parental controls and limit end users access to illicit, lewd, or other unapproved content. Such restrictions can be imposed during periods of peak usage where carrier network resources are scarce. In such scenarios, the capacity management agent can be configured to prevent content requests for the unapproved content from being forwarded from the carrier network to the specified content provider. The capacity management agent may instead return an error message to the end user. This ensures that resources are not utilized for unapproved uses.

In some other embodiments, the parental controls provided by the capacity management agent can be used to monitor end user usage so that a particular end user does not exceed an allotted amount of resources. Specifically, for an end user that is a member of a group or family plan, the capacity management agent may limit the bandwidth when that end user disproportionately consumes bandwidth for the group or where the usage for the group has exceeded an allotment threshold.

To provide such parental controls, the capacity management agent of some embodiments is configured with one or more rules that restrict access to a set of predefined sites or domains when network performance parameters reach a particular threshold. Additionally, the capacity management agent can be configured to prevent access to particular sites that consume large amounts of bandwidth when resource usage exceeds a particular threshold. For example, the YouTube video streaming site may be restricted to ensure that bandwidth is available for other sites.

B. Transparent Bandwidth Modification

In some embodiments, the capacity management agent provides alternate means with which to improve the capacity of the carrier network, better monetize available resources, or provide QoS controls. In some such embodiments, the capacity management agent dynamically adjusts the bandwidth that is allocated for downstream data traffic passing from the carrier network to end users.

In some embodiments, the capacity management agent monitors the carrier network condition parameters to identify congested service regions of carrier network. To improve capacity for these congested areas, the capacity management agent intercepts data that passes from an external data network and that is intended to reach an end user that is located within one of the congested service regions. The capacity management agent caches the intercepted data. Then, the capacity management agent passes the data from its cache through the carrier network to the end user at a bandwidth limited reduced rate. Specifically, the capacity management agent modifies the bandwidth based on the determined amount of congestion at the destination service region. The greater the amount of congestion, the more the capacity management agent restricts bandwidth. In this manner, the capacity management agent can choke bandwidth usage of certain users and preserve bandwidth for other users. Such bandwidth management ensures that capacity is available for more users at times of peak usage and that certain end users do not disproportionately consume the carrier network bandwidth when downloading large files or when streaming audio or video content.

Figure 10:
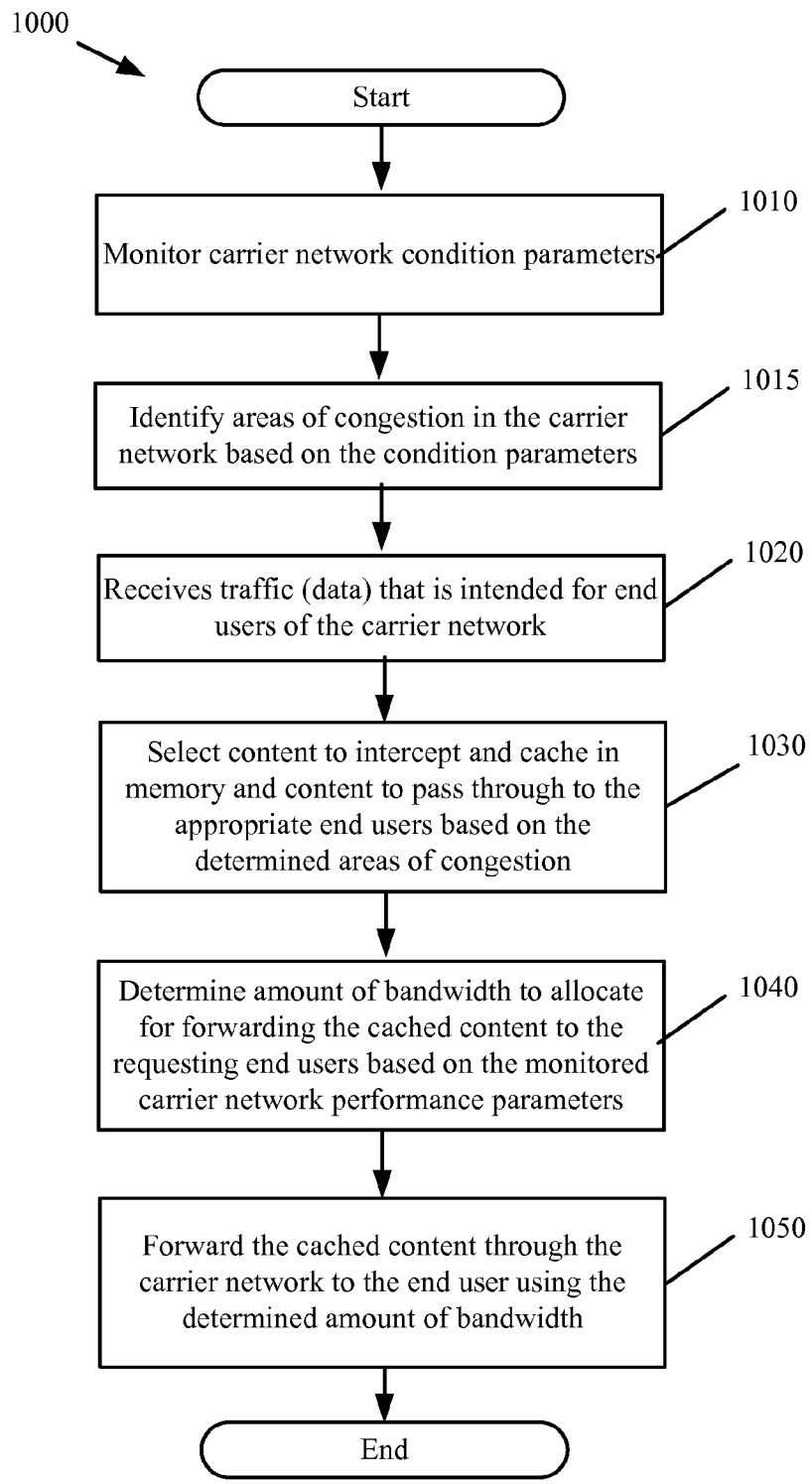
FIG. 10 presents a process performed by the capacity management agent to dynamically adjust the bandwidth usage of end users in order to improve capacity of the carrier network in accordance with some embodiments.

FIG. 10 presents a process 1000 performed by the capacity management agent to dynamically adjust the bandwidth usage of end users in order to improve capacity of the carrier network in accordance with some embodiments. The process 1000 begins when data is being streamed from an external data network to an end user of the carrier network.

The process monitors (at 1010) the carrier network condition parameters to identify resource usage throughout the carrier network. Alternatively, the process may monitor the condition parameters for a set of service regions of the carrier network that the capacity management agent manages. The carrier network condition parameters are retrieved by polling the databases of the carrier network. As earlier noted, these databases identify real-time traffic conditions, areas of congestion, number of active users, etc. across the various service regions of the carrier network. Based on the monitored condition parameters, the process identifies (at 1015) congested service regions where resources are limited.

While monitoring the carrier network condition parameters, the process receives (at 1020) downstream data traffic that is intended for end users of the carrier network. The process selects which content (at 1030) to intercept and cache in memory for bandwidth modification and which content to pass through to the appropriate end users. The selection is based on analyzing the destination address for the downstream traffic and determining whether the destination maps to a congested service region. The mapping of destination address to the service regions is specified in the condition parameters that are pulled from the carrier network databases. In some embodiments, the addressing for the downstream traffic and service regions is specified using IP addresses, IP addresses and port numbers, session identifiers, or other identifiers. In some embodiments, the process caches content that is part of a large file download, video stream, or audio stream. Other smaller content is passed through. Such content can be identified from the protocols being used and the protocol header values.

The process determines (at 1040) an amount of bandwidth to allocate when forwarding the cached content to the requesting end users. The bandwidth allocation is based on the carrier network condition parameters that identify the amount of congestion at a particular service region. Depending on the amount of congestion, the process can allocate greater or less bandwidth. The process forwards (at 1050) the cached content through the carrier network to the requesting end users at a rate that is determined based on the allocated amount of bandwidth.

In this manner, the capacity management agent transparently improves capacity of the carrier network without transcoding or otherwise altering the content that is being streamed from external data networks. The carrier network, end users, and content providers are unaware and unaffected by the bandwidth management. Moreover, such bandwidth management is effective for wireless carrier networks as end user mobility is managed by the carrier network and does not impact the capacity management agent's ability to modify bandwidth. Therefore, the bandwidth management is effective even when end users are handed over from one service region to another. The bandwidth management can also be dynamically updated so that when an end user is handed over from a congested service region to an uncongested service region, the capacity management agent can identify the movement of the end user between the service regions and alter the bandwidth accordingly.

Figure 11:
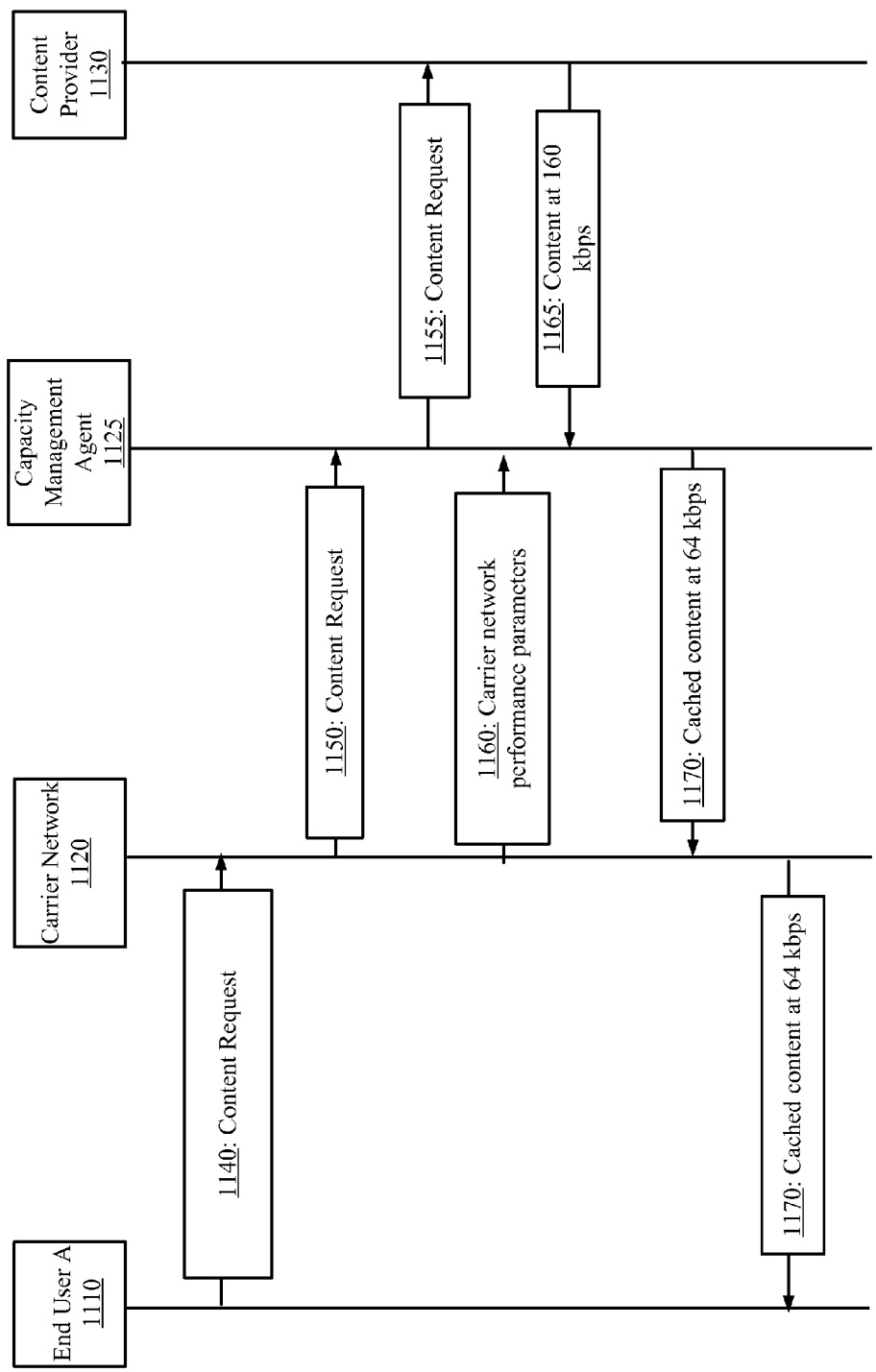
FIG. 11 presents a message exchange to illustrate the bandwidth modification that is performed by the capacity management agent in accordance with some embodiments.

FIG. 11 presents a message exchange to illustrate the bandwidth modification that is performed by the capacity management agent in accordance with some embodiments. The figure includes an end user 1110, carrier network 1120, capacity management agent 1125, and content provider 1130. In this figure, it is assumed that the service region in which the end user 1110 is located is congested.

The end user's 1110 content request is passed (at 1140) to the carrier network 1120. The capacity management agent 1125 intercepts (at 1150) the content request as the carrier network 1120 passes the content request to the content provider 1130 through an external data network. The capacity management agent 1125 may modify the content request if supported by the content provider 1130. The capacity management agent passes (at 1155) the unmodified or modified content request to the content provider 1130.

Based on previously pulled (at 1160) carrier network condition parameters, the capacity management agent 1125 determines that the service region from which the content request originates is congested. Therefore, data that is streamed to that location should be bandwidth limited.

The content provider 1130 returns the requested content to the carrier network 1120. In this figure, the content provider 1130 sends (at 1165) the content at a first rate that consumes 160 kbps of bandwidth. The capacity management agent 1125 is positioned to receive the content before it reaches the carrier network 1120. The capacity management agent 1125 analyzes the content to determine its destination. Upon detecting that content is intended for the end user 1110 that is located within the congested service region, the capacity management agent 1125 intercepts and caches the content to memory. Next, the capacity management agent 1125 determines the amount with which to throttle the downstream bandwidth to the end user 1110. This determination is based on the carrier network condition parameters and the amount of congestion at the service region. The network condition parameters are continually polled by the capacity management agent 1125 in order to retain a real-time status for the carrier network conditions. The capacity management agent forwards (at 1170) the cached content to the end user 1110 through the carrier network at a second rate that is less than the first rate. In this figure, the second rate consumes 64 kbps of bandwidth. By reducing the allotted bandwidth from 160 kbps to 64 kbps, the capacity management agent 1125 conserves 96 kbps of bandwidth at the congested service region for other end users. The end user 1110 continues to receive the content albeit at a reduced rate. The end user 1110 experience may be unaffected by the reduced bandwidth as some applications dynamically adjust to the reduced rate by automatically adjusting the quality of the stream so that a lower quality version of the content is streamed from the content provider.

In some embodiments, the capacity management agent adaptively modifies the allocated amount of bandwidth as the carrier network conditions change. Therefore, during a single streaming session, the capacity management agent may stream content at a first rate when a particular service region at which an end user is located is congested, stream the content at a second rate when the particular service region is less congested, and stream the content at a third rate when the particular service region is even less congested. This adaptive modification similarly applies when the end user is handed over from a congested service region to a less or more congested service region.

Figure 12:
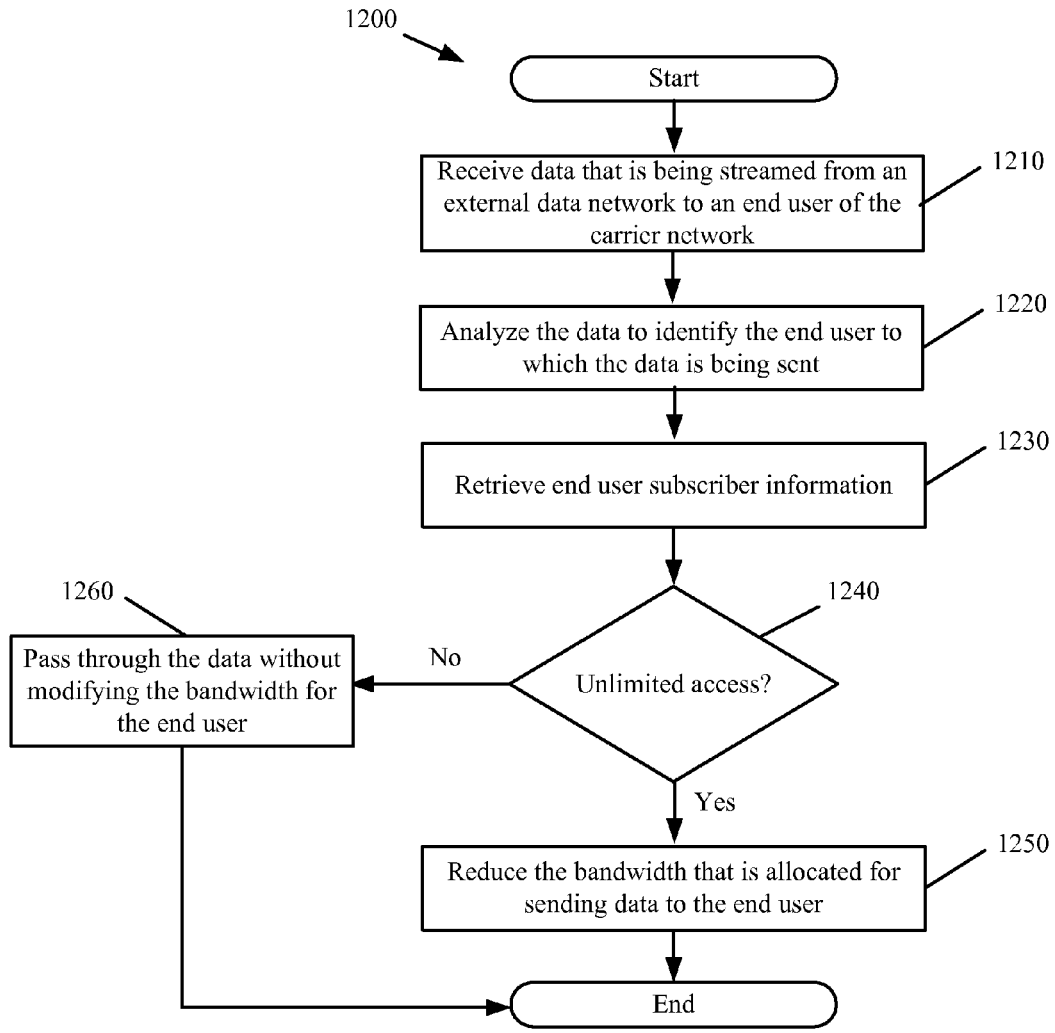
FIG. 12 presents a process performed by the capacity management agent to modify bandwidth for purposes of monetizing the available resources of the carrier network in accordance with some embodiments.

In some embodiments, the capacity management agent performs bandwidth modification to better monetize the available resources of the carrier network and to provide QoS controls. FIG. 12 presents a process 1200 performed by the capacity management agent to modify bandwidth for purposes of monetizing the available resources of the carrier network in accordance with some embodiments.

The process receives (at 1210) data that is being streamed from an external data network to an end user of the carrier network. The process analyzes (at 1220) the data to identify the end user to which the data is being sent. The process retrieves (at 1230) the end user's subscriber information from the databases of the carrier network or from a local database that stores a copy of the end user subscriber information. From the retrieved end user subscriber information, the process (at 1240) determines whether the end user is provided unlimited access or whether the end user pays for each unit of data that is downloaded from the carrier network (i.e., pay-per-access plan).

For an end user with unlimited access, the process reduces (at 1250) the bandwidth that is allocated for sending data to the end user. As described above, bandwidth is reduced by caching the data at the capacity management agent and passing the data from the cache to the end user using a reduced bandwidth. For an end user with pay-per-access, the process passes (at 1260) through the data to the end user without modifying the bandwidth for that end user so that the pay-per-access end user is able to consume more data than an unlimited access end user.

Figure 13:
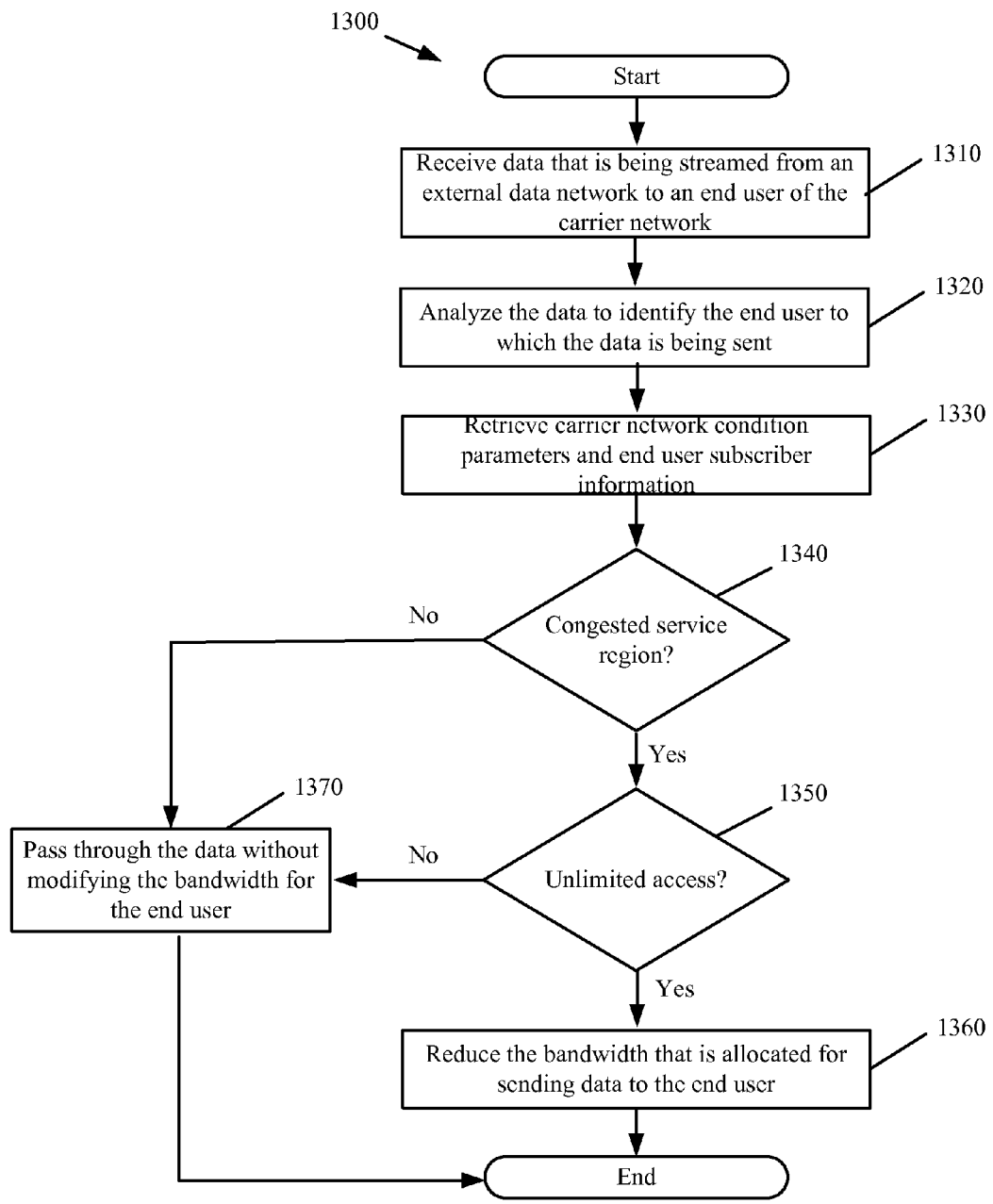
FIG. 13 presents a process performed by the capacity management agent to modify bandwidth for purposes of providing QoS controls in accordance with some embodiments.

FIG. 13 presents a process 1300 performed by the capacity management agent to modify bandwidth for purposes of providing QoS controls in accordance with some embodiments. As in FIG. 12 above, the process receives (at 1310) data that is being streamed from an external data network to an end user of the carrier network. The process analyzes (at 1320) the data to identify the end user to which the data is being sent. The process retrieves (at 1330) the carrier network condition parameters and the end user's subscriber information. From the condition parameters, the process determines (at 1340) whether the service region at which the end user is located is congested. When the service region is not congested, the process passes (at 1370) through the data to the end user without modifying the bandwidth. However, when the service region is congested, the process determines (at 1350) whether the end user is provided unlimited access or whether the end user is pay-per-access end user. For an end user with unlimited access, the process reduces (at 1360) the bandwidth that is allocated for sending data to the end user. For a pay-per-access end user, the process passes (at 1370) through the data to the end user without modifying the bandwidth. In this manner, the capacity management agent performs bandwidth modification to provide a first QoS to end users with unlimited access and a second QoS to end users with pay-per-access.

It should be apparent to one of ordinary skill in the art that resource monetization and QoS controls can be performed based on criteria other than whether the end user has unlimited access or pay-per-access. In some embodiments, the capacity management agent can base these decisions on other end user subscriber information. For example, the capacity management agent can reduce resource consumption for end users with personal subscriber plans without reducing resource consumption for end users with business subscriber plans. Alternatively, the capacity management agent can base its decision on the amount of data that is consumed in the last month with high usage end users receiving bandwidth modification to limit further resource usage.

C. Dual Modification

In some embodiments, the capacity management agent performs content request modification and bandwidth modification to improve carrier network capacity. In some such embodiments, content request modification is performed for those content providers that support the modified content requests and bandwidth modification is performed for those content providers that do not support the modified content requests. Alternatively, bandwidth modification may be performed in addition to content request modification when carrier network change, when an end user overrides settings in a modified content request, or when a content provider ignores settings in a modified content request.

Figure 14:
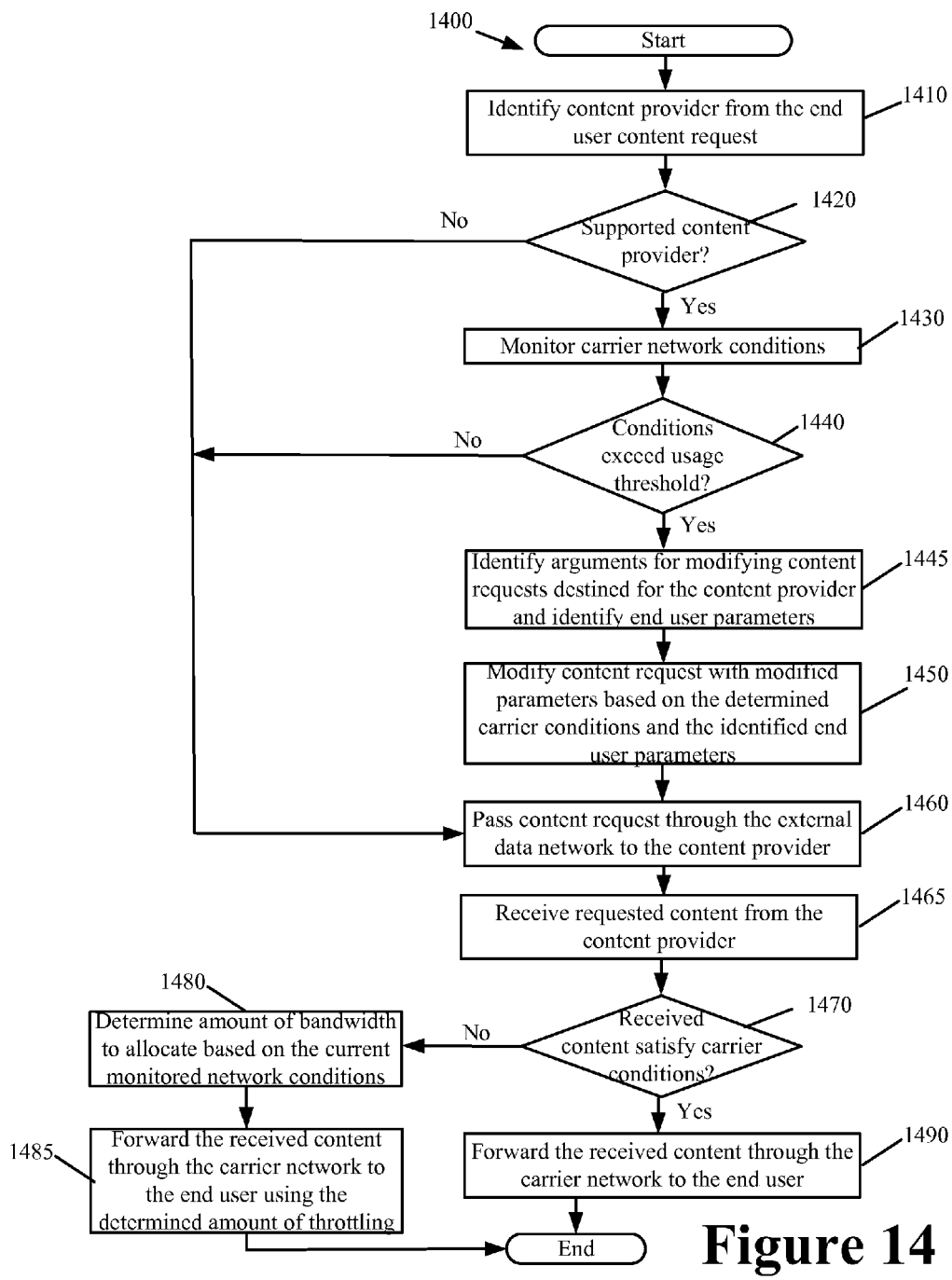
FIG. 14 presents a process for performing content request modification and bandwidth modification in accordance with some embodiments.

FIG. 14 presents a process 1400 for performing content request modification and bandwidth modification in accordance with some embodiments. The process 1400 begins when an end user content request is intercepted by the capacity management agent. The process identifies (at 1410) the content provider from the content request and determines (at 1420) whether the content provider supports modifications to the content request.

When modifications are not supported, the process passes (at 1460) the content request through the external data network to the content provider. Otherwise, the process monitors (at 1430) the carrier network conditions to determine (at 1440) whether the conditions at the service region at which the content request originated exceeds a usage threshold. When the usage threshold is not exceeded indicating that the service region is not congested, the process passes (at 1460) the content request through the external data network to the content provider. Otherwise, the process identifies (at 1445) arguments that are supported by the identified content provider and end user parameters that can be used in optimizing the modified content request. Using the identified parameters and monitored conditions, the process modifies (at 1450) the content request and the content request is passed (at 1460) through the external network to the identified content provider.

Next, the process receives (at 1465) the requested content as it is streamed from the content provider. The process determines (at 1470) whether the received content satisfies the current carrier network conditions. For example, if the content request was modified to specify a reduced rate and the content provider is streaming the requested content at the reduced rate then no further modifications need to be applied when streaming the content through the carrier network to the end user. However, the content provider may ignore the specified reduced rate within the modified content request or the carrier network conditions may have changed requiring further modification of the stream before it can be forwarded to the end user. When no further modifications are needed, the process forwards (at 1490) the content through the carrier network to the end user and the process ends. However, when modifications are required, the process determines (at 1480) the amount of bandwidth to allocate to the received content and the process forwards (at 1485) the received content through the carrier network to the end user using the determined amount of bandwidth. Though the process 1400 is shown for a single content request and a single content stream, it should be apparent that the process 1400 operates over multiple simultaneous content requests and multiple simultaneous content streams.

III. Computer System

Many of the above-described processes and components are implemented as software processes that are specified as a set of instructions recorded on a non-transitory computer-readable storage medium (also referred to as computer readable medium). When these instructions are executed by one or more computational element(s) (such as processors or other computational elements like ASICs and FPGAs), they cause the computational element(s) to perform the actions indicated in the instructions. Computer and computing machine are meant in their broadest sense, and can include any electronic device with a processor including cellular telephones, smartphones, portable digital assistants, tablet devices, laptops, notebooks, servers, and desktop computers. Examples of computer readable media include, but are not limited to, CD-ROMs, flash drives, RAM chips, hard drives, EPROMs, etc.

Figure 15:
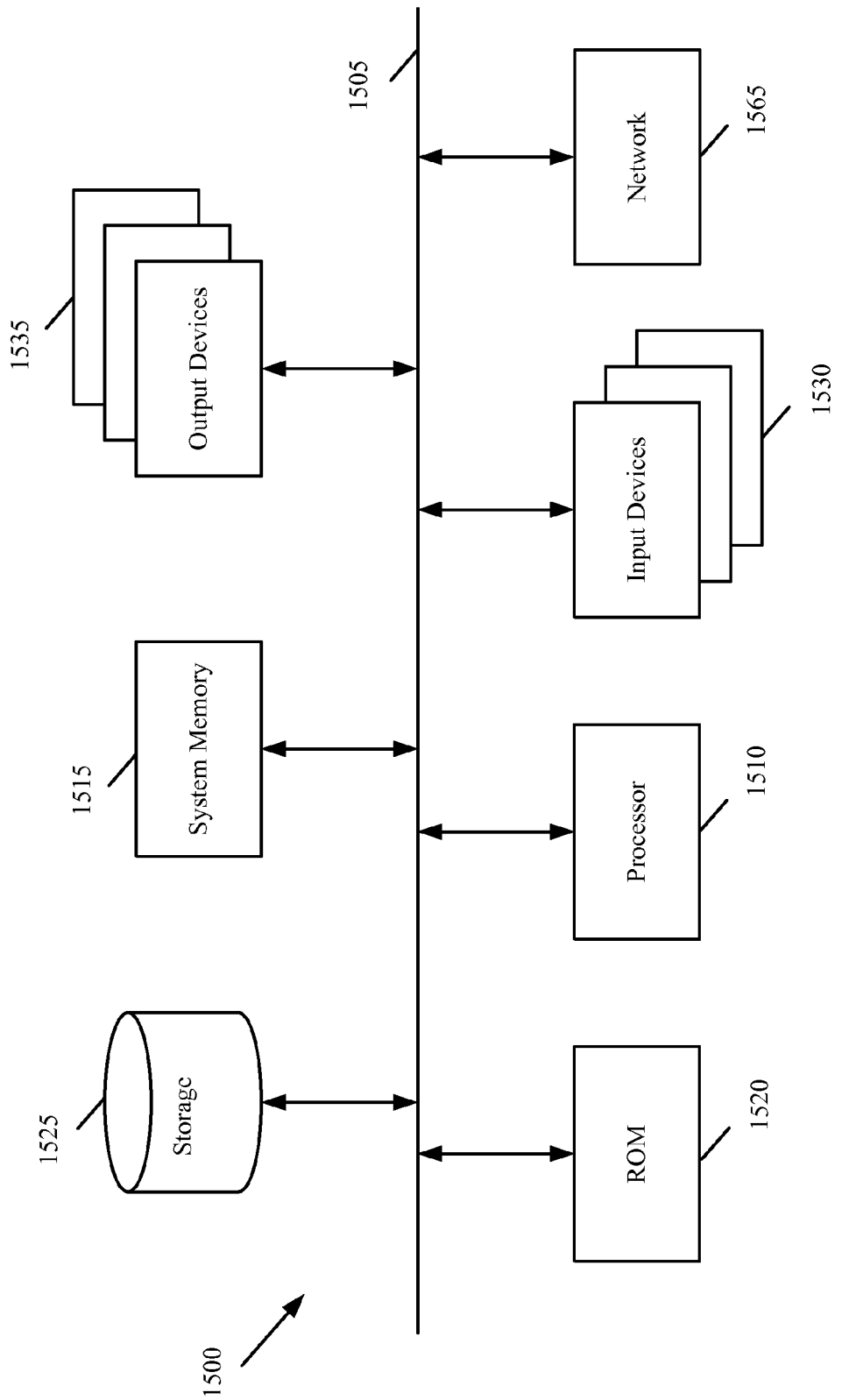
FIG. 15 illustrates a computer system or server with which some embodiments are implemented.

FIG. 15 illustrates a computer system or server with which some embodiments are implemented. Such a computer system includes various types of computer readable mediums and interfaces for various other types of computer readable mediums that implement the various processes and modules described above (e.g., the capacity management agent). Computer system 1500 includes a bus 1505, a processor 1510, a system memory 1515, a read-only memory 1520, a permanent storage device 1525, input devices 1530, and output devices 1535.

The bus 1505 collectively represents all system, peripheral, and chipset buses that communicatively connect the numerous internal devices of the computer system 1500. For instance, the bus 1505 communicatively connects the processor 1510 with the read-only memory 1520, the system memory 1515, and the permanent storage device 1525. From these various memory units, the processor 1510 retrieves instructions to execute and data to process in order to execute the processes of the invention. The processor 1510 is a processing device such as a central processing unit, integrated circuit, graphical processing unit, etc.

The read-only-memory (ROM) 1520 stores static data and instructions that are needed by the processor 1510 and other modules of the computer system. The permanent storage device 1525, on the other hand, is a read-and-write memory device. This device is a non-volatile memory unit that stores instructions and data even when the computer system 1500 is off. Some embodiments of the invention use a mass-storage device (such as a magnetic or optical disk and its corresponding disk drive) as the permanent storage device 1525.

Other embodiments use a removable storage device (such as a flash drive) as the permanent storage device Like the permanent storage device 1525, the system memory 1515 is a read-and-write memory device. However, unlike storage device 1525, the system memory is a volatile read-and-write memory, such as random access memory (RAM). The system memory stores some of the instructions and data that the processor needs at runtime. In some embodiments, the processes are stored in the system memory 1515, the permanent storage device 1525, and/or the read-only memory 1520.

The bus 1505 also connects to the input and output devices 1530 and 1535. The input devices enable the user to communicate information and select commands to the computer system. The input devices 1530 include alphanumeric keypads (including physical keyboards and touchscreen keyboards), pointing devices (also called "cursor control devices"). The input devices 1530 also include audio input devices (e.g., microphones, MIDI musical instruments, etc.). The output devices 1535 display images generated by the computer system. The output devices include printers and display devices, such as cathode ray tubes (CRT) or liquid crystal displays (LCD).

Finally, as shown in FIG. 15, bus 1505 also couples computer 1500 to a network 1565 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 1500 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. For a first data network that provides users with access to data from a second external data network, a computer-implemented method comprising:
    receiving a request that originates from a user operating within the first data network, the request identifying requested content and a source for the requested content, wherein the source is accessible from the second external data network;
    determining utilization of the first data network;
    modifying said request when utilization of the first data network exceeds a specified level; and
    passing said request to the second external data network for delivery to the source, wherein the source provides a first encoding of the requested content in response to an unmodified request and a second encoding of the requested content in response to a modified request, wherein the first encoding utilizes more resources of the first data network than the second encoding for delivering said content to the user.

2. The computer-implemented method of claim 1, wherein the first encoding encodes the requested content at a first bitrate and the second encoding encodes the requested content at a second bitrate, and wherein the first bitrate is greater than the second bitrate.

3. The computer-implemented method of claim 1, wherein the first encoding encodes the requested content at a first resolution and the second encoding encodes the requested content at a second resolution, and wherein the first resolution is greater than the second resolution.

4. The computer-implemented method of claim 1, wherein the first encoding encodes the requested content at a first compression level and the second encoding encodes the requested content at a second compression level, and wherein the first compression level provides lesser compression of the content than the second compression level.

5. The computer-implemented method of claim 1, wherein the request specifies a URL identifying the requested content and the source for the requested content, wherein modifying said request comprises appending a query string argument to the URL, and wherein the query string argument specifies at least one parameter for selecting the second encoding of the requested content.

6. The computer-implemented method of claim 1, wherein modifying said request comprises embedding at least one parameter for a device of the user in the request, and wherein the parameter enables the source to identify the second encoding to be optimal for the device of the user as compared to the first encoding.

7. The computer-implemented method of claim 1, wherein modifying said request comprises identifying capabilities for a device of the user and embedding at least one parameter to the request for selection of the second encoding over the first encoding, and wherein the second encoding is optimized for the device of the user.

8. The computer-implemented method of claim 1, wherein modifying said request comprises modifying a header of the request by including a parameter within the header to cause the source to provide the second encoding of the requested content.

9. The computer-implemented method of claim 1, wherein the request comprises a URL, wherein modifying the request comprises altering the URL to point to the second encoding instead of the first encoding.

10. A computer-implemented method for providing users of a first data network with access to data from a second external data network, the computer-implemented method comprising:
   receiving a content request that originates from a user operating within the first data network, the content request for requesting a first encoding for particular content that is hosted by a source in the second external data network;
   obtaining parameters for the user;
   modifying the content request to produce an optimized content request for selection of a second encoding of the particular content instead of the first encoding based on the user parameters prior to forwarding the content request from the first data network to the source in the second external data network; and
   passing the optimized content request to the second external data network for delivery to the source, wherein the source provides the second encoding for the particular content in response to receiving the optimized content request, wherein the second encoding is optimized for the user and is delivered using fewer resources of the first data network than the first encoding.

11. The computer-implemented method of claim 10 further comprising determining congestion at a service region of the first data network from which the user originates the content request.

12. The computer-implemented method of claim 11, wherein modifying the content request comprises optimizing the content request to produce the optimized content request when the congestion at the service region exceeds a specified threshold.

13. The computer-implemented method of claim 10 further comprising determining from the user parameters, a content parameter for selecting the second encoding, and wherein modifying the content request comprises introducing into the content request, the content parameter that is determined from the user parameters.

14. The computer-implemented method of claim 10, wherein the content request comprises a header and a URL identifying the first encoding for the particular content, and wherein modifying the content request comprises at least one of (i) appending a query string argument to the URL that specifies at least one of the user parameters and (ii) embedding at least one of the user parameters into the header of the content request.

15. The computer-implemented method of claim 10 further comprising accessing a database of the first data network storing the parameters for the user.

16. A non-transitory computer-readable storage medium with an executable program stored thereon, the program for transparently managing capacity of a first data network that provides user access to data from a second external data network, wherein the program instructs a microprocessor of an apparatus located within the first data network to perform sets of instructions for:
   configuring a list of a plurality of content that supports a plurality of different encodings;
   intercepting a request identifying a first encoding of particular content from the plurality of content, said request originating from a user operating in the first data network and addressed to a source in the second external data network;
   selecting a second encoding from a plurality of encodings supported for the particular content based on at least one of (i) a first set of parameters identifying utilization of the first data network and (ii) a second set of parameters identifying a device of the user originating the request;
   modifying the request to identify the second encoding of the particular content instead of the first encoding; and
   passing said modified request to the second external data network for delivery to the source, wherein the source provides the second encoding for the particular content in response to receiving the modified content request.

17. The non-transitory computer-readable storage medium of claim 16, wherein selecting the second encoding from the plurality of encodings comprises a set of instructions for selecting the second encoding for the particular content that consumes greater resources of the first data network than the first encoding during delivery of the particular content to the user when the first set of parameters identify under-utilization of the first data network.

18. The non-transitory computer-readable storage medium of claim 16, wherein selecting the second encoding from the plurality of encodings comprises a set of instructions for selecting the second encoding for the particular content that consumes fewer resources of the first data network than the first encoding during delivery of the particular content to the user when the first set of parameters identify over-utilization of the first data network.

19. A non-transitory computer-readable storage medium with an executable program stored thereon, the program for transparently managing capacity of a first data network that provides user access to data from a second external data network, wherein the program instructs a microprocessor of an apparatus located within the first data network to perform sets of instructions for:
   configuring a list of restricted content;
   intercepting a content request that originates from a user operating within the first data network and that is addressed to a source in the second external data network, the content request for requesting particular restricted content that is in the configured list of restricted content; and restricting access to the particular restricted content when utilization of the first data network satisfies a utilization threshold, wherein restricting access comprises passing substitute content in place of the particular restricted content.

20. The non-transitory computer-readable storage medium of claim 19, wherein the program further comprises a set of instructions for passing the content request to the second external data network for delivery to the source when the utilization of the first data network does not satisfy the utilization threshold, wherein the source provides the particular restricted content in response to receiving the content request.

21. The non-transitory computer-readable storage medium of claim 19, wherein the program further comprises a set of instructions for determining the utilization of the first data network by communicably coupling to a database of the first data network.

22. The non-transitory computer-readable storage medium of claim 19, wherein the set of instructions for restricting access further comprises a set of instructions for not forwarding the content request to the second external data network.

* * * * *